US008086717B2

(12) United States Patent
Miyata et al.

(10) Patent No.: US 8,086,717 B2
(45) Date of Patent: *Dec. 27, 2011

(54) PRESENCE INFORMATION MANAGEMENT SYSTEM AND PRESENCE INFORMATION MANAGEMENT SERVER

(75) Inventors: Tatsuhiko Miyata, Kokubunji (JP); Kenji Kasuga, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/662,124

(22) Filed: Mar. 31, 2010

(65) Prior Publication Data
US 2010/0191802 A1    Jul. 29, 2010

Related U.S. Application Data

(63) Continuation of application No. 11/330,323, filed on Jan. 12, 2006, now Pat. No. 7,720,952.

(30) Foreign Application Priority Data

Apr. 1, 2005 (JP) ................................. 2005-105600

(51) Int. Cl.
G06F 15/173    (2006.01)
(52) U.S. Cl. ......... 709/223; 709/203; 709/217; 709/224
(58) Field of Classification Search .................. 709/223, 709/224, 227, 229, 203, 204, 217, 219, 206; 455/406, 414.1, 435.1, 518
See application file for complete search history.

(56) References Cited

U.S. PATENT DOCUMENTS

| 6,757,722 | B2 | 6/2004 | Lönnfors et al. |
| 7,035,923 | B1 | 4/2006 | Yoakum et al. |
| 7,233,589 | B2 * | 6/2007 | Tanigawa et al. ............. 370/352 |
| 2003/0065788 | A1 * | 4/2003 | Salomaki ....................... 709/227 |
| 2003/0108002 | A1 * | 6/2003 | Chaney et al. ................ 370/261 |
| 2004/0071150 | A1 * | 4/2004 | Honkala et al. .............. 370/401 |
| 2004/0098491 | A1 * | 5/2004 | Costa-Requena et al. .... 709/229 |

(Continued)

FOREIGN PATENT DOCUMENTS

| JP | 2003-186900 | 12/2001 |
| JP | 2003-196243 | 12/2001 |
| JP | 2005-085172 | 9/2003 |

(Continued)

OTHER PUBLICATIONS

M. Day et al., "A Model for Presence and Instant Messaging", Network Working Group, Informational, Feb. 2000, pp. 1-17.

(Continued)

Primary Examiner — Lashonda Jacobs
(74) Attorney, Agent, or Firm — Stites & Harbison PLLC; Juan Carlos A. Marquez, Esq.

(57) ABSTRACT

When starting subscribe for acquiring presence information, there is no need of acquiring an identifier of the presentity or an identifier of the group, which have been conventionally indispensable. There is provided a state information management system including a management server for managing state information on a plurality of terminals. Instead of specifying a presentity, a condition of the presentity, such as a value of presence, is specified for subscribing. For example, when subscribe is established by specifying the identical current position as a condition, subscribe for the user matched with the condition is automatically started and the presence can be acquired. When the presence of a partner or user himself/herself is changed to a different value, the presentity is automatically changed.

8 Claims, 23 Drawing Sheets

U.S. PATENT DOCUMENTS

| | | | |
|---|---|---|---|
| 2004/0122901 A1* | 6/2004 | Sylvain | 709/206 |
| 2005/0210104 A1* | 9/2005 | Torvinen | 709/205 |
| 2005/0228895 A1* | 10/2005 | Karunamurthy et al. | 709/229 |
| 2006/0224746 A1* | 10/2006 | Watanabe | 709/227 |
| 2006/0248184 A1* | 11/2006 | Wu et al. | 709/224 |
| 2007/0071209 A1* | 3/2007 | Horvitz et al. | 379/201.06 |
| 2007/0078965 A1* | 4/2007 | Shimamura et al. | 709/224 |
| 2007/0142065 A1 | 6/2007 | Richey et al. | |
| 2007/0265859 A1* | 11/2007 | Jachner | 705/1 |
| 2008/0114776 A1* | 5/2008 | Sun et al. | 707/10 |
| 2008/0117921 A1* | 5/2008 | Morris | 370/401 |

FOREIGN PATENT DOCUMENTS

| | | |
|---|---|---|
| JP | 2004-312694 | 12/2003 |
| JP | 2005-038393 | 4/2004 |

OTHER PUBLICATIONS

M. Day et al., "Instant Messaging/Presence Protocol Requirements", Network Working Group, Informational, Feb. 2000, pp. 1-26.

A. B. Roach, "Session Initiation Protocol (SIP)-Specific Event Notification" Network Working Group, Standards Track, Jun. 2002, pp. 1-38.

J. Rosenberg, "A Presence Event Package for the Session Initiation Protocol (SIP)", Network Working Group, Standards Track, Aug. 2004, pp. 1-27.

H. Sugano et al., "Presence Information Data Format (PIDF)", Network Working Group, Standards Track, Aug. 2004, pp. 1-28.

A. B. Roach et al., "A Session Initiation Protocol (SIP) Event Notification Extension for Resource Lists", Network Working Group, Internet-Draft, Oct. 22, 2004, pp. 1-45.

Office Action from Japanese Patent Office mailed Jul. 25, 2006.

You Yanagisawa et al., "Some Mutual Agreement Mechanisms for Multi-agent Systems", Information Management Thesis Journal, vol. 36, No. 6, Jun. 1996, Abstract only in English.

Office Action from Japanese Patent Office, dated Aug. 18, 2009, in Japanese.

* cited by examiner

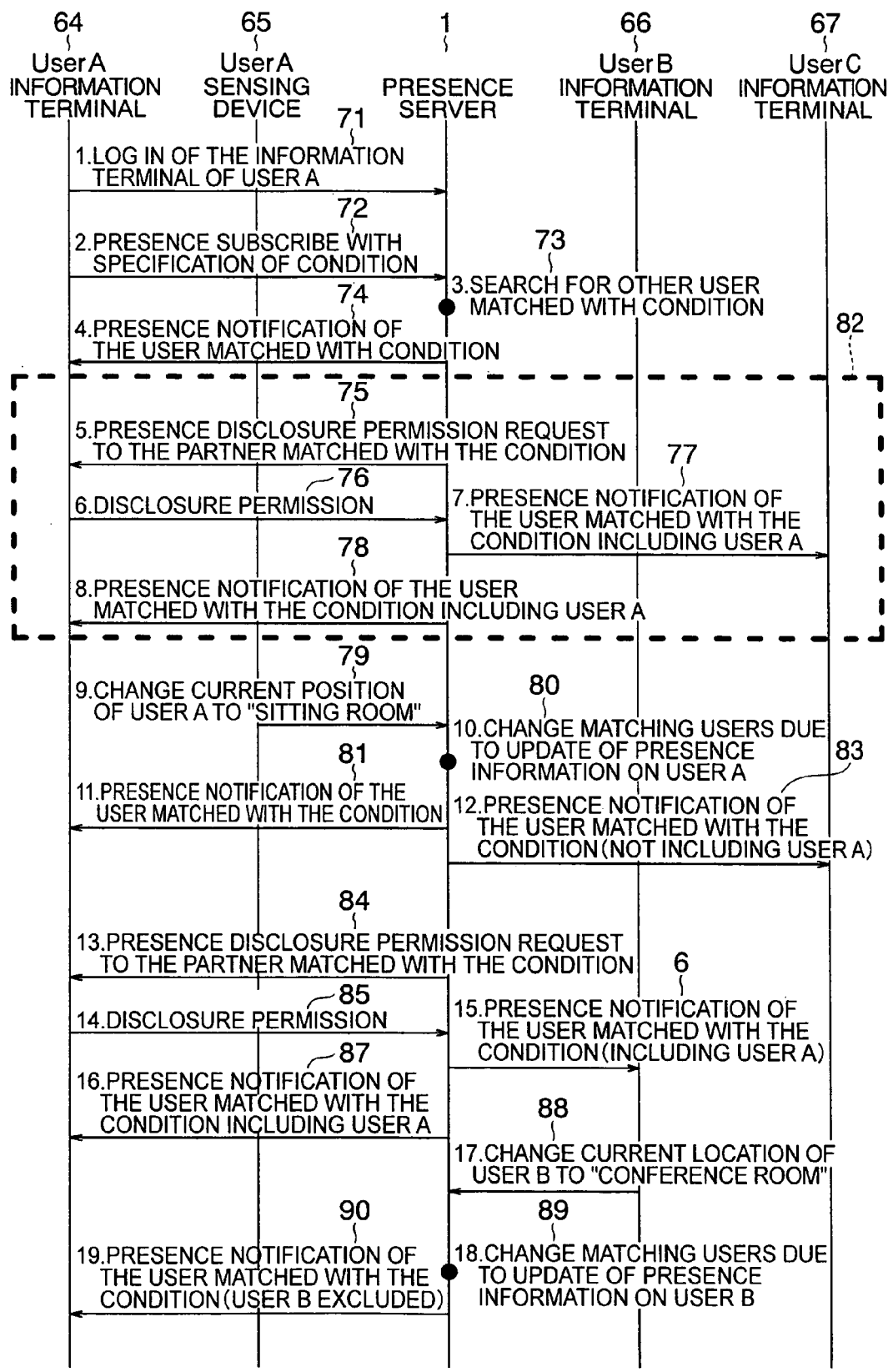

FIG. 6

```
SUBSCRIBE sip:UserA@abc.com SIP/2.0          — 101
To :UserA< sip:userA@abc.com >;tag=aaa
From:UserA<sip:userA@abc.com>                 — 102
Max-Forwards: 100
Call-ID:125533268@abc.com
CSeq: 3120 SUBSCRIBE
Contact:< sip:UserA@aa.abc.com>;
        target=location,match                 — 103

Expires : 3600
Event:presence
X-Target : location;requirement=match         — 104
Content-Length: 0
```

105

```
<?xml version="1.0" encoding "UTF-8"?>
<target presence="location" requrement="match"/>
<target presence="section" value=" DESIGN SECTION "/>
```

FIG. 7

```
NOTIFY sip:UserA@abc.com SIP/2.0
To:UserA<sip: UserA@abc.com>;tag=aaa
From: UserA<sip:UserA@:abc.com>;tag=bbb
Max-Forwards: 100
Call-ID: 125533268@a.ne.j p
CSeq: 4354 NOTIFY
Contact:< sip:prs@prs.abc.com >
Expires : 3598
Event : presence
Content-Length: xxx
```

111
112

```
--50UBfW7LSCVLtggUPe5z
Content-Transfer-Encoding: binary
Content-ID: <nXYxAE@pres.example.com>
Content-Type: application/rimi+xml;charset="UTF-8"

<?xml version="1.0" encoding="UTF-8"?>
<list xmlns="urn:ietf :params:xml:ns:rimi"
    uri="sip:adam-frlends@pres.example .com" version="1"
    fullState="true">
<name> CONFERENCE ROOM A, DESIGN SECTION </name>
<resource uri="sip:bob@example.com"">
   <name>Bob Smith</name>
   <instance id="juwigmtboe" state="active"
        cid="bUZBsM@pres.example.com"/>
</resource>
<resource uri="sip:dave@example.com">
   <name>Dave Jones</name>
   <instance id="hqzsuxtfyq" state="active'
        cid="ZvSvkz@pres.example.com"/>
</resource>
```

```
--50UBfW7LSCVLtggUPe5z
Content-Transfer-Encoding: binary
Content-ID: <bUZBsM@pres.example.com>
Content-Type: application/cpim-pidf+xml;charset="UTF-8"
<impp:presence
  xmlns:impp="urn:ietf:params:xml:ns:cpim-pidf"
  xmlns:local="urn:xxx.xxx.ne.jp"
  entity="sip:UserA@abc.com">
<impp:tuple id="User">
  <impp:status>
    <impp basic>open</impp:basic>
    <local:location>CONFERENCE ROOM A </local:location>
    <local:section>DESIGN SECTION </local:section>
    <local:comment>I WILL MOVE TO ANOTHER CONFERENCE ROOM AT 2 O'CLOCK </local:comment>
    <local :material>DETAILED DESIGN DOCUMENT 1 (MATERIAL 1-2) </local:material>
  </impp :status>
</impp:tuple>
</impp:presence>

--50UBfW7LSCVLtggUPe5z
Content-Transfer-Encoding: binary
Content-ID: <ZvSvkz@pres.example.oom>
Content-Type : application/cpim-pidf+xml; charset="UTF-8"

<impp:presence
  xmlns:impp="urn:ietf:params:xml:ns:cpim-pidf"
  xmlns:local ="urn:xxx.xxx.ne.jp"
  entity="sip:UserB@abc.com">
<impp:tuple id="User">
  <impp:status)
    <impp:basic>open</impp:basic>
    <local:location> CONFERENCE ROOM A </local:location>
    <local:section>DESIGN SECTION </local:section>
    <local:comment>NONE </local:comment>
    <local:material>PLAN FOR CORRECTING SPECIFICATION (MATERIAL 1-1) </local:material>
  </impp:status>
</impp:tuple>
</impp:presence>

--50UBfW7LSCVLtggUPe5z--
```

FIG. 9

| SUBSCRIBER | SUBSCRIBE MANAGEMENT NUMBER | CONDITION 1 | CONDITION 2 | CONDITION 3 | ... |
|---|---|---|---|---|---|
| sip:UserA@abc.com | 1 | ○○ | ○○ | ○○ | ... |
| sip:UserB@abc.com | 2 | ○○ | ○○ | | ... |
| sip:UserC@abc.com | 3 | ○○ | | | ... |
| ... | ... | ... | | ... | ... |

| SUBSCRIBE NUMBER | PRESENTITY |
|---|---|
| 1 | sip:UserB@abc.com |
| 1 | sip:UserD@abc.com |
| 1 | sip:UserE@abc.com |
| 2 | sip:UserA@abc.com |
| 2 | sip:UserC@abc.com |

| TEMPLATE NAME | CONDITION 1 | CONDITION 2 | CONDITION 3 | ... |
|---|---|---|---|---|
| CONFERENCE | ○○ | ○○ | ○○ | |
| REST | ○○ | ○○ | ○○ | |
| ... | ... | | ... | ... |

FIG. 12

| CORRE-SPONDENCE TEMPLATE NAME | PRESENCE 1 | PRESENCE VALUE 1 | PRESENCE 2 | PRESENCE VALUE 2 | ... |
|---|---|---|---|---|---|
| A | location | CONFERENCE ROOM | section | DESIGN SECTION | |
| B | location | CONFERENCE ROOM | | | |
| D | location | MEETING ROOM | | | |
| C | location | SITTING ROOM | | | |
| ... | ... | ... | ... | ... | |

FIG. 23
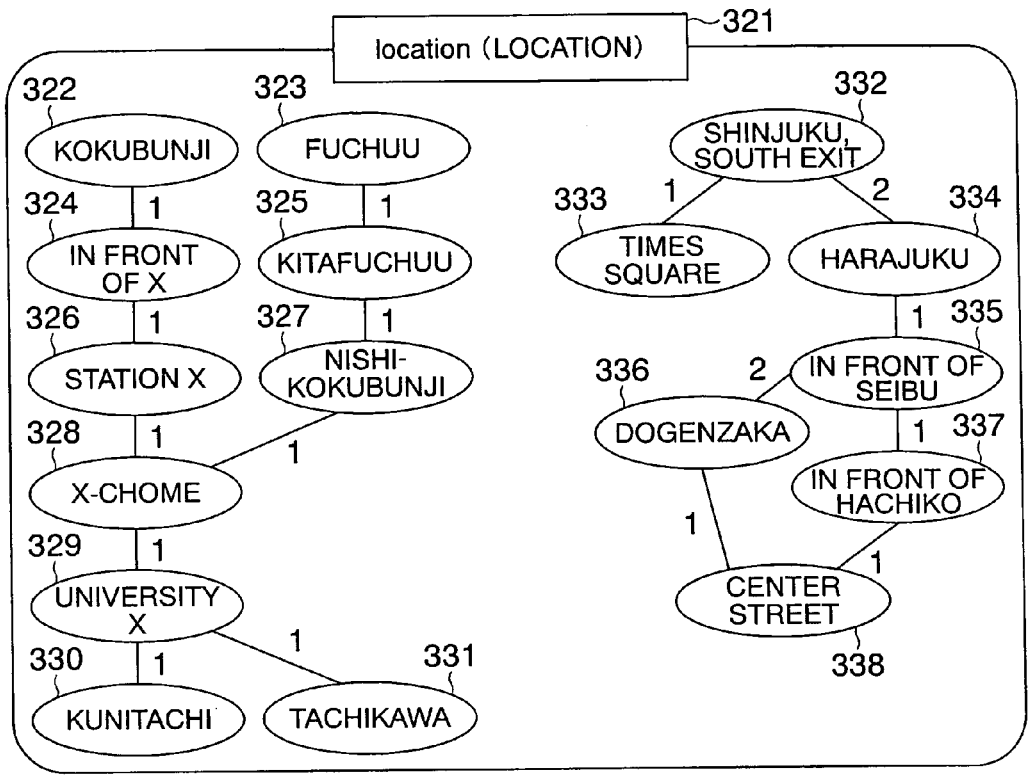
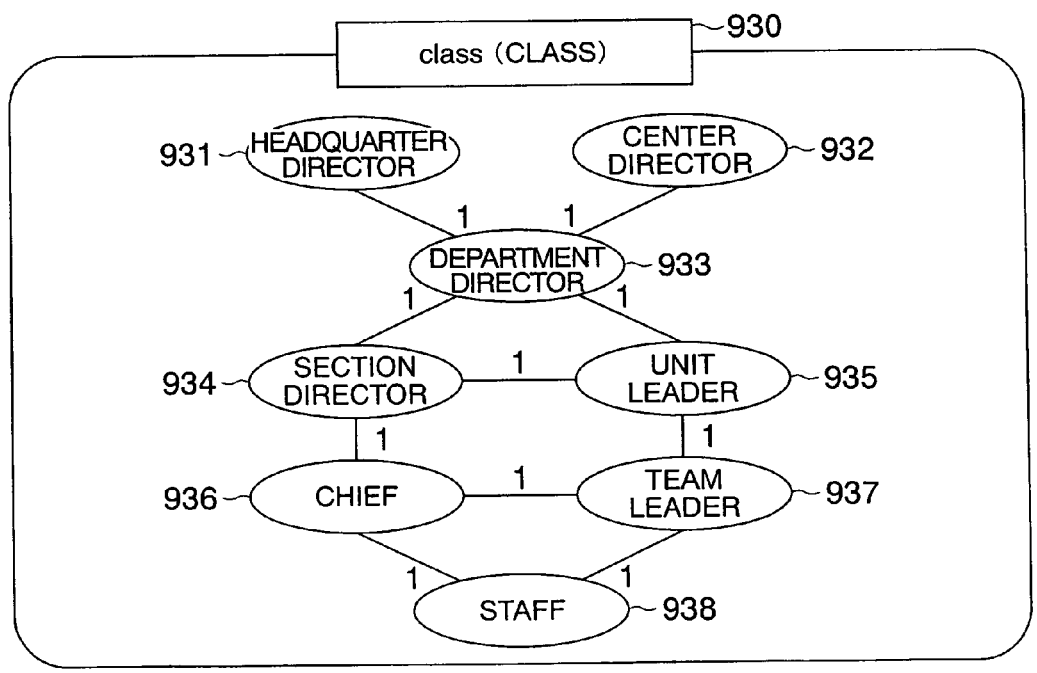

PRESENCE INFORMATION MANAGEMENT SYSTEM AND PRESENCE INFORMATION MANAGEMENT SERVER

CROSS-REFERENCE TO RELATED APPLICATION

This application is a Continuation application of U.S. application Ser. No. 11/330,323 filed Jan. 12, 2006 now U.S. Pat. No. 7,720,952. Priority is claimed based on U.S. application Ser. No. 11/330,323 filed Jan. 12, 2006, which claims the priority to Japanese Application 2005-105600 filed on Apr. 1, 2005, the content of which is hereby incorporated by reference into this application.

BACKGROUND OF THE INVENTION

The present invention relates to an information disclosure setting method.

There has been developed various inter-user state grasp techniques using the concept called "presence". The "presence" literally means "existence" of each user for notifying other users. More specifically, the presence means a current location and current state of each user and other information on the existence of each user. By reporting the "presence" to another user in real time, it is possible to grasp the current state of the partner. The concept of the presence and the communication technique has been developed from the IM (Instant Messaging). The IM and the concept of the presence is being standardized by the impp (Instant Messaging and Presence Protocol) working group of the IETF (Internet Engineering Task Force) (see RFC 2778 and RFC 2779). Moreover, the specific presence communication technique is being discussed and standardized by various IETF working groups according to the concept defined by the impp. Outline of the presence communication technique will be explained by referring to FIG. 15. Here, explanation will be given by using the presence communication technique using SIP (Session Initiation Protocol) which is being standardized by the SIMPLE (Sip for Instant Messaging and Presence Leveraging Extensions) working group of the IETF (Internet Engineering Task Force) which is one of the representative communication techniques of the presence.

FIG. 15 shows transmission and reception of presence information between a terminal of user A denoted by 182, a terminal of user B denoted by 183, and a terminal of user C denoted by 184.

For example, when user A denoted by 182 wants to know presence information on user B and user C in the format as shown by 185, user A gets identifiers (SIP-URI in SIP) of user B and user C, specifies the SIP-URI of user B and user C, and transmits a SIP message SUBSCRIBE message requesting for notification of presence reception (hereinafter, this operation will be referred to as subscribe) to a presence server 181. Upon reception of the message, the presence server 181 reports the presence information on the corresponding SIP-URI, i.e., presence information on user B and user C to user A by using the SIP NOTIFY message. After this, as long as the subscribe from user A to user B and user C is valid, each time user B and user C update their presence information for the presence server 181, update is reported to user A by using a NOTIFY message. The definition on the basic presence information communication using these SIP is detailed in RFC 3265 and RFC 3856. Moreover, there is another communication method which is a batch acquisition of presence information by specifying the group. For example, a buddy list as shown in 185 is considered as one group. A group identifier as shown in 188 is assigned to the group and the group is held in the presence server 181. When user A denoted by 182 wants to know the presence information on user B and user C, user A transmits a SUBSCRIBE message by specifying a group identifier 188 containing user B and user C as group members instead of specifying the SIP-URI of user B and user C and transmitting separate SUBSCRIBE messages requesting for notification of the presence information. Thus, user A can at once get the presence information on user B and user C who are group members. The SIMPLE working group of the IETF calls this method, i.e., specifying the group and getting the presence information on the group members at once, "eventlist subscribe", which is defined in IETF Internet Draft draft-ietf-simple-event-list-06.txt.

The outline of the presence information communication technique has been explained by using the SIP but the basic concept is same when another communication technique is used. The basic model is such that a user who wants to read presence information on another person specifies the user identifier of the user subjected to presence read or the group identifier of the group to which the user belongs and transmits a presence information notification request message to a server having presence information transmission/reception function such as the 181, thereby getting the presence information on the another person.

SUMMARY OF THE INVENTION

When using the subscribe method with specification of a user identifier or the subscribe method with specification of group identifier so as to get presence information on the member users at once, the user who subscribes should explicitly specify the identifier (user identifier or group identifier) to be subscribed when transmitting a SUBSCRIBE message requesting for reporting the presence information. In this method, the user should know the user identifier or the group identifier of the partner user to be subscribed. When the user wants to reference presence temporarily, it is difficult to realize a presence information communication model for changing the subscribe object in a short time by this method of subscription. For example, a user may want to temporarily get presence information on a conference member whom the user firstly met in a conference the user attended, or may want to know the state of other users in a conference room although the user does not know the name of the conference name (i.e., group identifier), or the user wants to get presence information on persons sitting around the table at which the user is sitting. In such cases, if the user should check the user identifier or the group identifier to which the user temporarily belongs, the usability is lowered.

It is possible to transmit a SUBSCRIBE message by specifying an item having presence information to be a condition object and the condition for the item instead of specifying the partner identifier or the group identifier. For example, a user can subscribe by using a condition that the presence information on "the current location" is "identical". Here, if the "current location" of the user who has made subscription is "conference room No. 201", the other users whose "current location" is "conference room No. 201" are automatically subscribed and it is possible to get presence information. After this, when the "current location" of the user who is establishing subscription is changed to "a laboratory No. 502", the subscription to the members when reading the presence information while the "current location" is "conference room No. 201" is automatically released and subscription for the members whose "current location" is "laboratory No. 502" is automatically started. Moreover, the user to be subscribed sets in advance whether to disclose the presence information or the disclosure degree for subscription from another user, thereby protecting himself/herself so that no presence information other than required is disclosed to other users.

Each user need not explicitly specify the partner user identifier or group identifier when creating subscription. Thus, it is possible to eliminate the need of getting the identifier of the object to be subscribed and the usability is enhanced. Moreover, since the users to be subscribed are automatically changed as the change of the presence information on the user himself/herself, the number of messages required when changing the subscribe objects can be reduced.

Other objects, features and advantages of the invention will become apparent from the following description of the embodiments of the invention taken in conjunction with the accompanying drawings.

BRIEF DESCRIPTION OF THE DRAWINGS

FIG. 5 is shows an operation sequence of the connection format using the device of the present invention.

FIG. 6 shows a SIP message when requesting for presence information to be transmitted by the user to the device of the present invention.

FIG. 7 shows a SIP message when reporting the presence information to be transmitted to user from the device of the present invention.

FIG. 8 shows a SIP message when reporting the presence information to be transmitted to user from the device of the present invention.

FIG. 9 shows a conditional subscribe management table stored in the device of the present invention.

FIG. 10 is a presentity management table stored in the device of the present invention.

FIG. 11 shows a subscribe condition template table stored in the device of the present invention.

FIG. 12 shows a permission setting table stored in the device of the present invention.

FIG. 23 shows relationship between presence information contents.

DETAILED DESCRIPTION OF EMBODIMENTS

Embodiment 1

In this embodiment, firstly, explanation will be given on the logical structure, physical structure, and operation outline of the server transmitting and receiving presence information and a network for realizing the service using the server. After this, explanation will be given on the processing performed by the device of the present invention by referring to a data example held in the server and a flowchart example.

Figure 1:
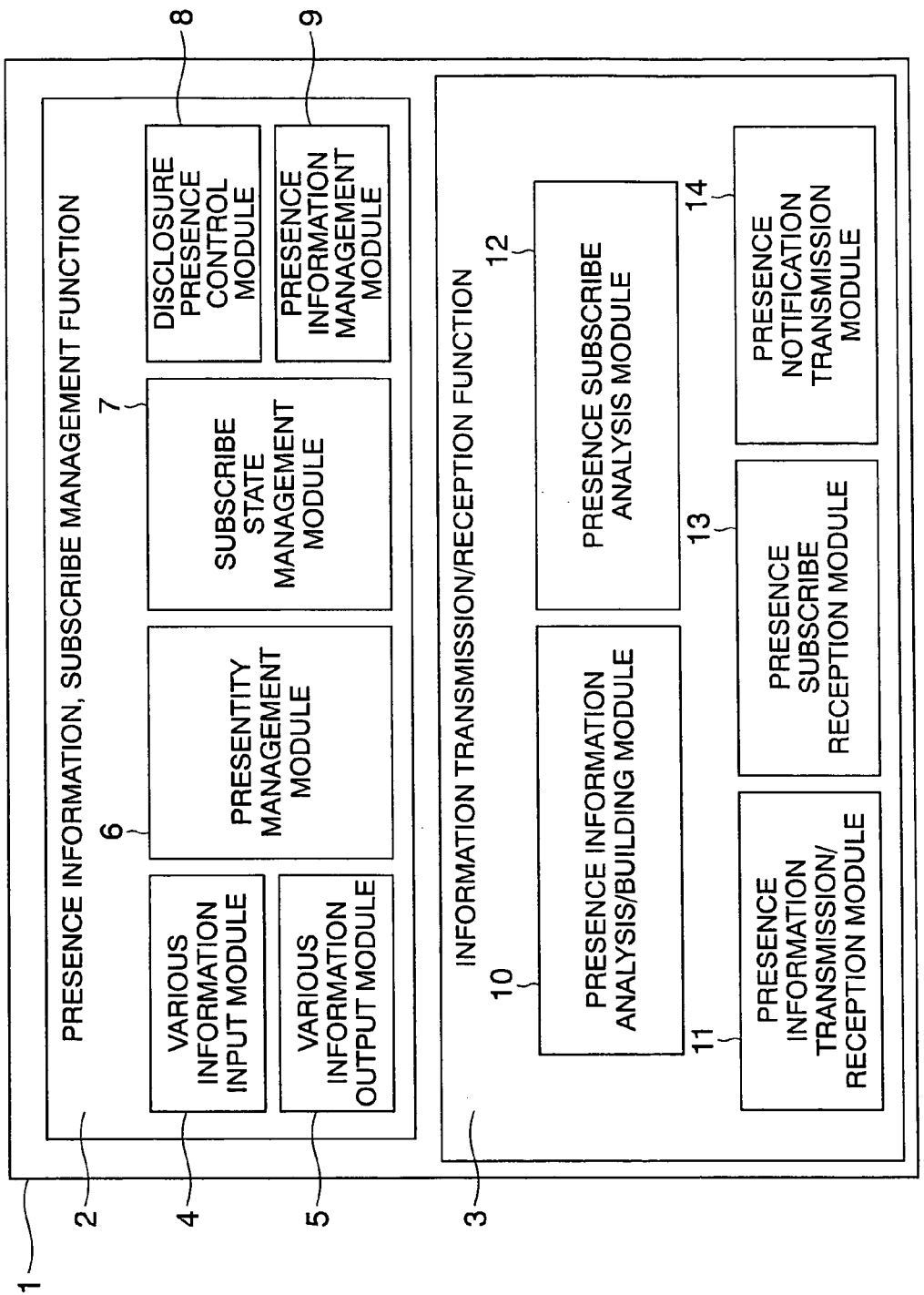
FIG. 1 is a functional block diagram of a presence server employing the conditional subscribe method according to the present invention.

FIG. 1 shows a functional block diagram of the server transmitting and receiving presence information according to the present embodiment. The functional block diagram of FIG. 1 shows a logical functional configuration which is realized in software but each functional block may also be realized by hardware.

Figure 2:
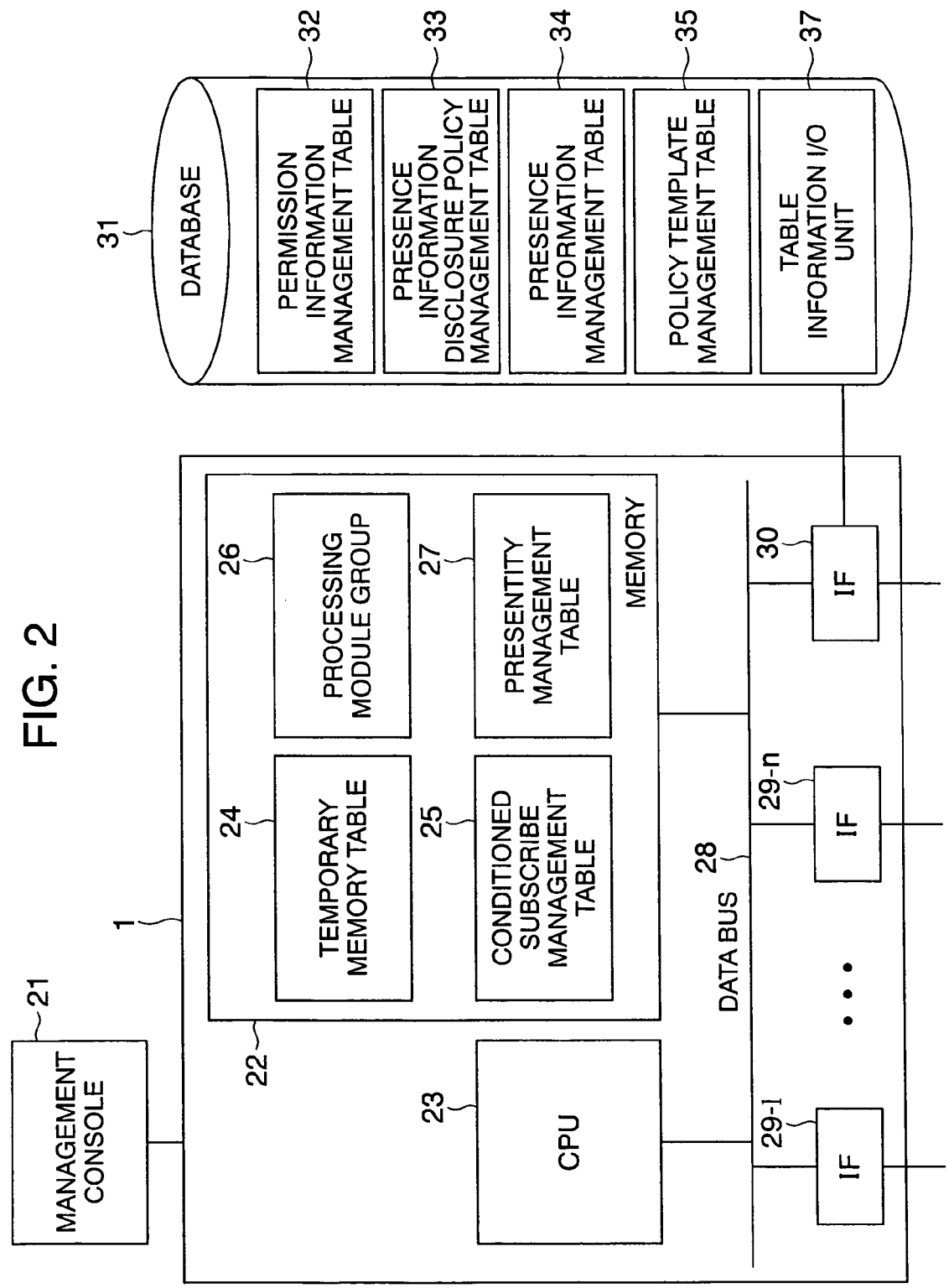
FIG. 2 is a block diagram of a presence server device employing the conditional subscribe method according to the present invention.

FIG. 2 shows how the functional blocks of FIG. 1 are realized in hardware. Operation of various functional blocks shown in FIG. 1 are contained in a processing module group 26 of a memory 22 shown in FIG. 2 and the operation procedure is read out to be executed by a CPU 23 during operation. Information required for operation of each of the processing modules is stored in a database 31 and a temporary memory table 24 in the memory 22 and read out and written in when required. The read out and write in from/into the database 31 is performed via an interface (IF) 30 and a table information I/O unit 37. It should be noted that the database 31 and the server 1 may be formed by physically different devices or logically formed in the same device.

Figure 3:
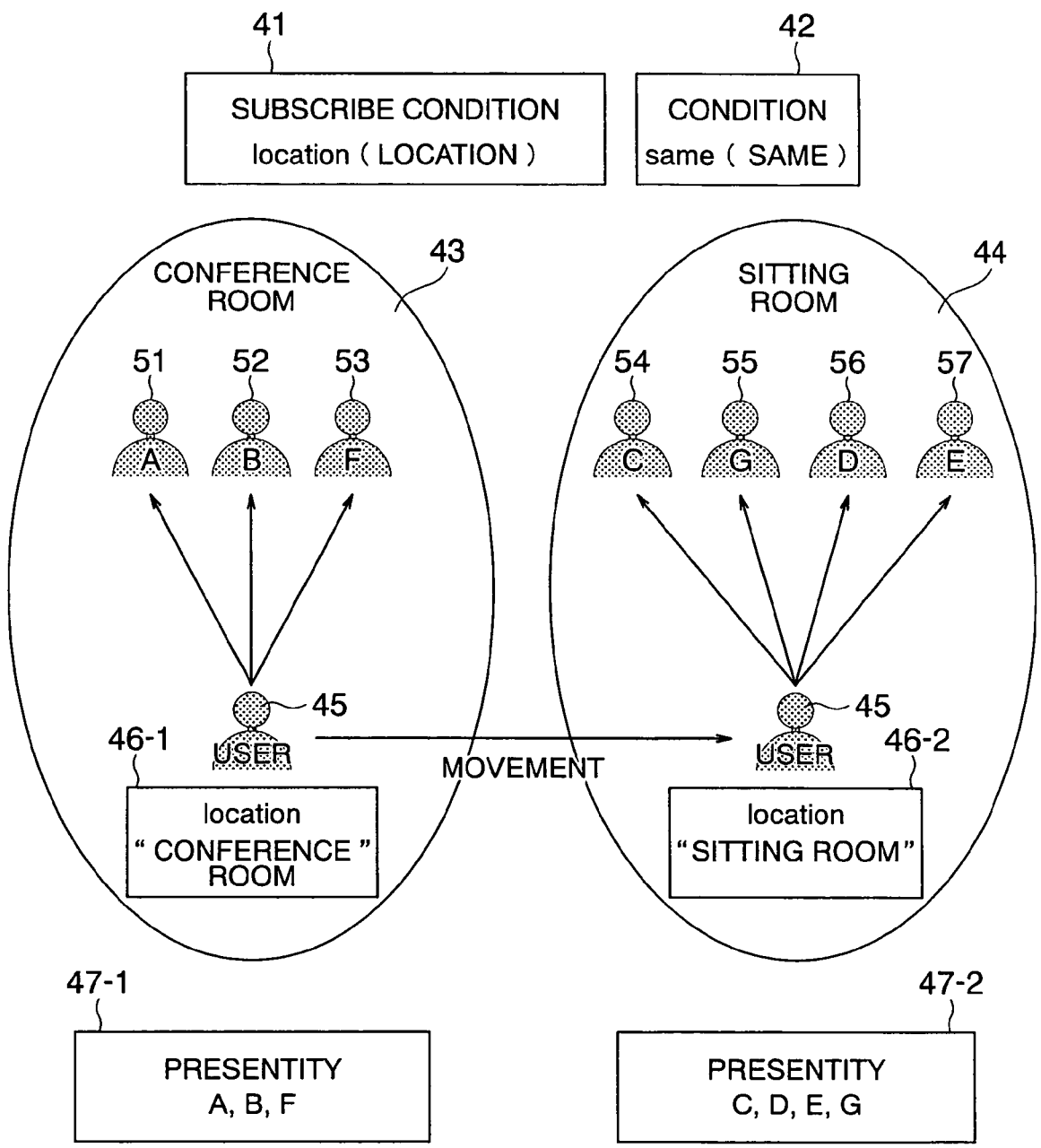
FIG. 3 shows an outline of the operation of the device according to the present invention.

Firstly, referring to the operation concept shown in FIG. 3, explanation will be given on the operation which can be performed by each user by using the server 1 having the function for transmitting and receiving the presence information shown in FIG. 1 and FIG. 2. FIG. 3 shows a state that a user denoted by 45 is performing subscribe for the server 1 by setting the presence item to be subjected to the subscribe condition to the "location" denoted by 41 and its condition to "the same" as denoted by 42. Here, if the user denoted by 45 is currently in a conference room 43 and has registered his/her presence information "location" to "the conference room" as denoted by 46-1, the server 1 automatically recognizes that A denoted by 51, B denoted by 52, and F denoted by 53 whose presence information "location" is the same "conference room" as subscribe objects as denoted by 47-1. The user denoted by 45 can acquire presence information on A, B, and F. It is assumed that after this, the user 45 moves to a sitting room. The user 45 updates the presence information "location" to "sitting room" as denoted 46-2. The server 1 discards the subscribe object of 47-1 upon update of the presence information and automatically recognizes C denoted by 54, G denoted by 55, D denoted by 56, and E denoted by 57 whose presence information "location" is the same "sitting room" as the subscribe objects as denoted by 47-2. The user 45 can get presence information on C, G, D, E. That is, once the user 45 transmits a message requesting for subscribe to the server 1, the server 1 automatically changes the subscribe object from 47-1 to 47-2 according to the state change of the user. Thus, the user establishing subscribe can start subscribe for the partners depending on the case without explicitly changing the subscribe object. Moreover, it is possible to terminate subscribe of the partners which has become unnecessary without explicitly declaring it.

Next, explanation will be given on an example of detailed content of the aforementioned operation by referring to the module diagram of FIG. 1, a physical hardware diagram of FIG. 2, a network of FIG. 4, a sequence of FIG. 5, message examples of FIG. 6 to FIG. 8, tables of FIG. 9 to FIG. 14, and flowcharts of FIG. 16 to FIG. 20. However, the specific transmission/reception message contents, sequences, table configuration, software module configuration, hardware configuration, and the processing flowcharts are merely given as an example and other method and configurations can also be used to realize the target operation and obtain the effects of the invention.

Figure 4:
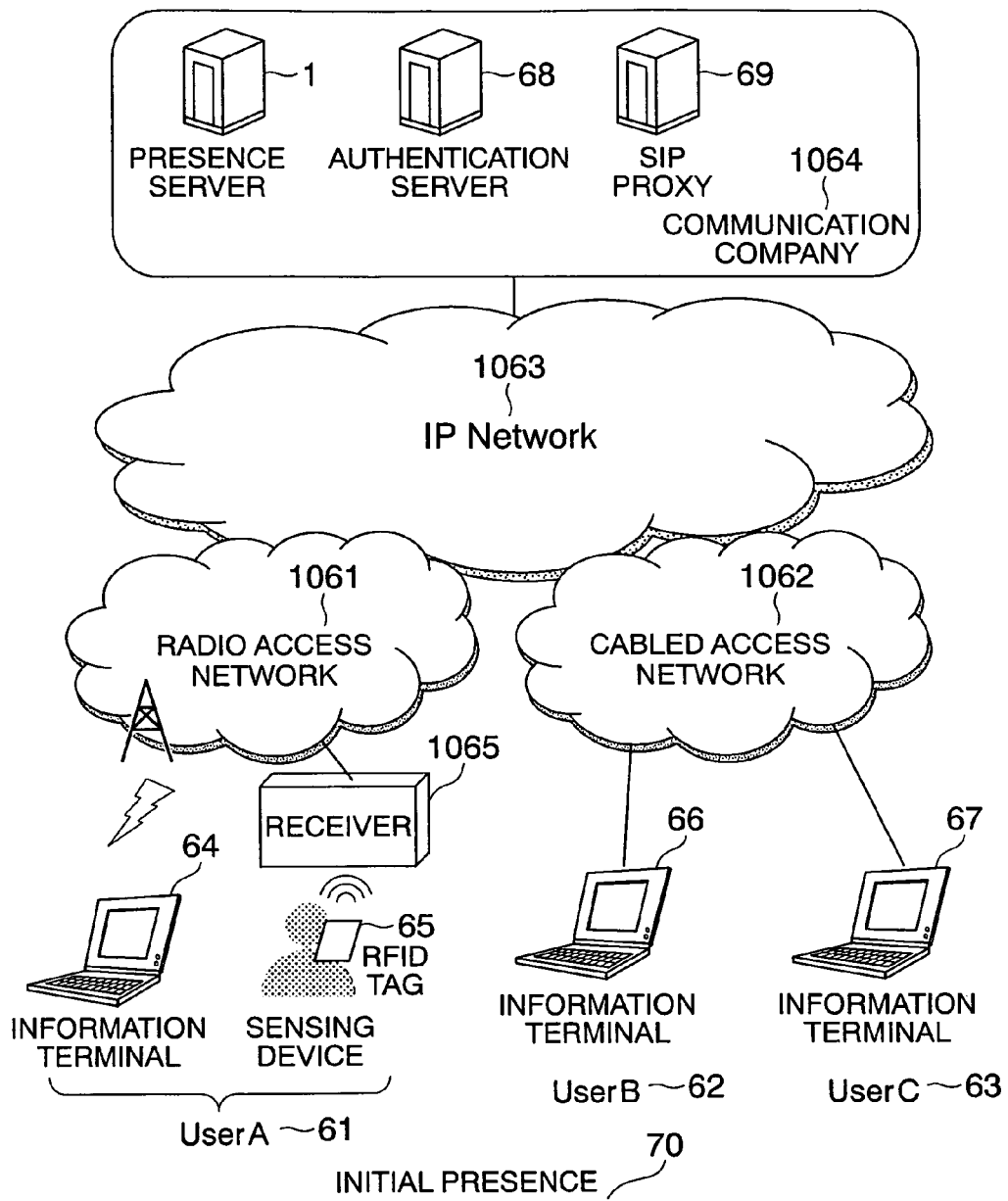
FIG. 4 is a network diagram showing a connection format using the device of the present invention.
Figure 13:
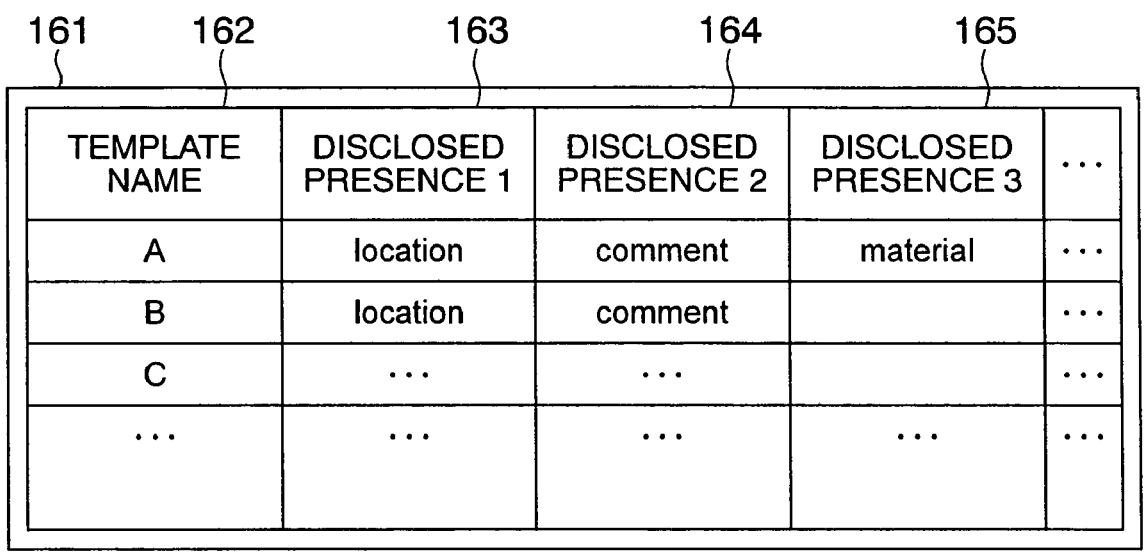
FIG. 13 shows a permission setting table stored in the device of the present invention.
Figure 14:
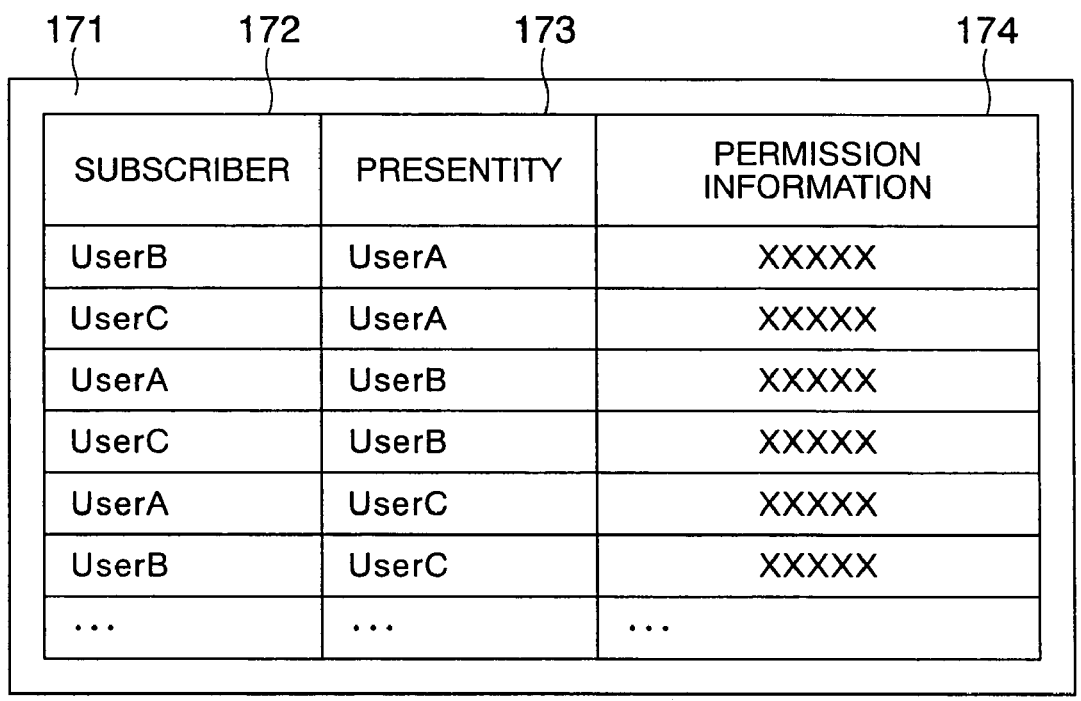
FIG. 14 shows a permission setting table stored in the device of the present invention.
Figure 15:
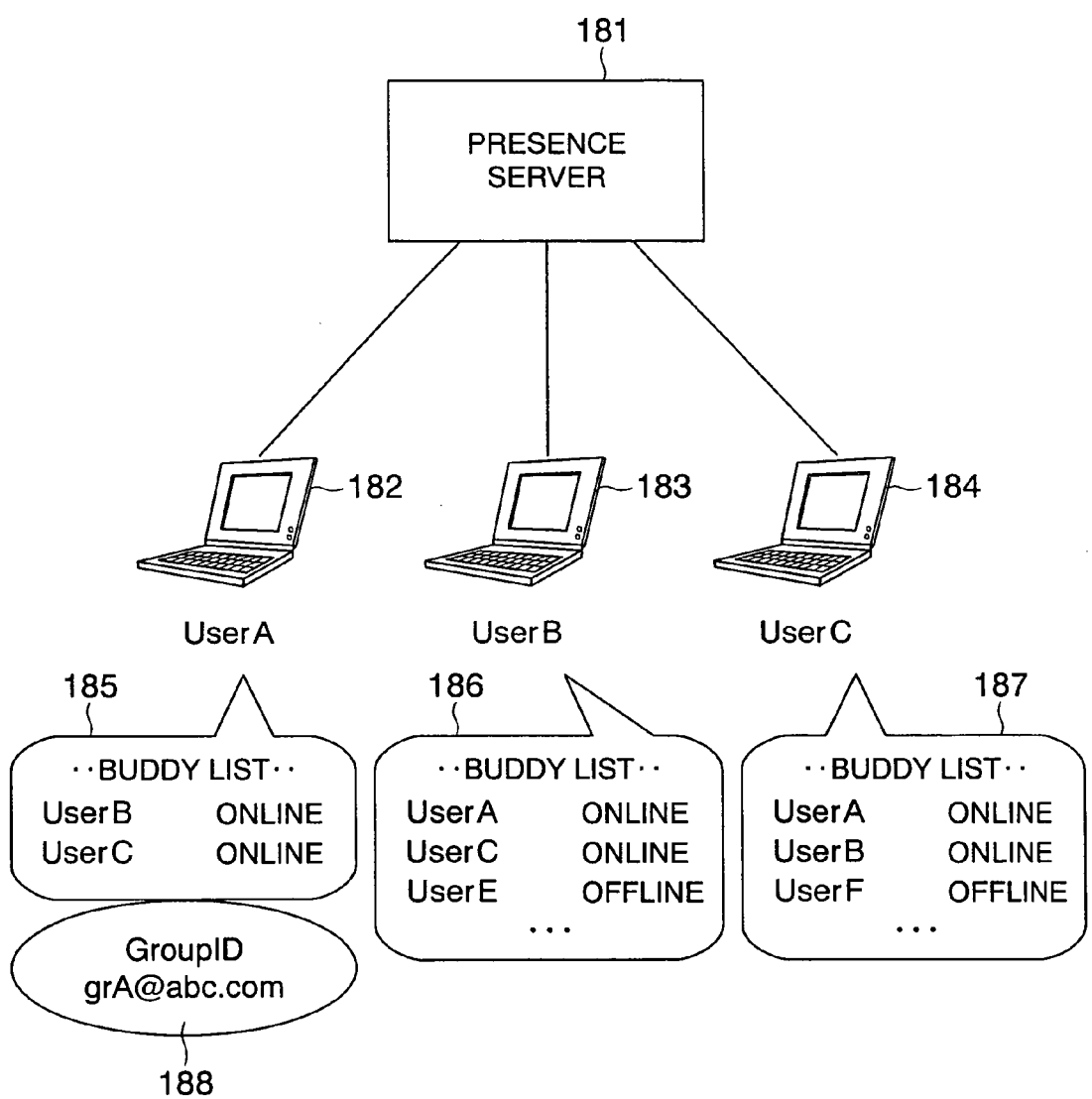
FIG. 15 shows a network when using the conventional technique.

FIG. 4 shows a network of a service example using the present invention. On this network, user A denoted by 61, user B denoted by 62, and user C denoted by 63 access the presence transmission/reception server 1 owned by the communication company 1064 via a radio access network 1061, a cable access network 1062, and an IP network 1063 for reading presence information on other users. That is, the users subscribe other users. Each terminal may be using an authentication server 68 and a SIP server 69 owned by the communication company 1064. Moreover, it is assumed that user A is using an information terminal denoted by 64 and a sensing device denoted by 65. The sensing device means a device capable of registering the user's location information in the server by some method such as a small size tag of RFID (Radio Frequency Identification) and GPS-equipped mobile telephone capable of transmitting its current location. By using the sensing device, it is possible to radio-report the current location of the user to the system by using a receiver as denoted by 1065. In this example, user A uses the sensing device as a second terminal but the terminal may another device or terminal or application. Alternatively, the user A can use only the information terminal 64 without using a plurality of terminals.

FIG. 5 shows an operation sequence of FIG. 4. Referring to this sequence, detailed operation flow will be explained. It should be noted that upon start of the sequence of FIG. 4, the presence information on each user has the initial value shown in table 70 and it is assumed that user B and user C have completed the log-in processing to the server 1 and started the subscribe of condition specification type according to the present invention. Moreover, it is assumed that the subscribe condition of the subscribe of the condition specification type performed by user B and user C is identical to the subscribe condition of the condition specification type subscribe performed by user A, i.e., the presence information "location" is "same".

Firstly user A denoted by 61 logs in the presence information transmission/reception server 1 in step 71 by using the terminal 64. After the log in, control is passed to step 72, where a presence information request with specification of condition is transmitted. That is, the condition specification type subscribe according to the present invention is started.

FIG. 6 shows an example of the message used then, i.e., an example of a message when subscribe is performed by SIP. User A shows his/her SIP-URI without showing the SIP-URI of the partner user or a group as a presentity in the request line 101, To header 102 indicating the presentity. The request line and the To header should be described without fail because of the SIP message transfer regulation. However, like the SIP-URI of the user himself/herself shown in this example, any value may be used if the SIP message is transferred to the server 1. Moreover, the condition of the subscribe is described in the URI parameter 103 in the Contact header. Like this, the subscribe condition can be described by extension in the form of URI parameter in the existing header. It is also possible to describe the subscribe condition in the particularly extended header like 104 or in the SIP message body portion like 105. The condition may be described anywhere but at least one condition should be described for specifying a presentity by the server 1 from the subscribe condition. Moreover, by describing a plurality of conditions, it is possible to search for an object matching with a plurality of conditions.

Figure 16:
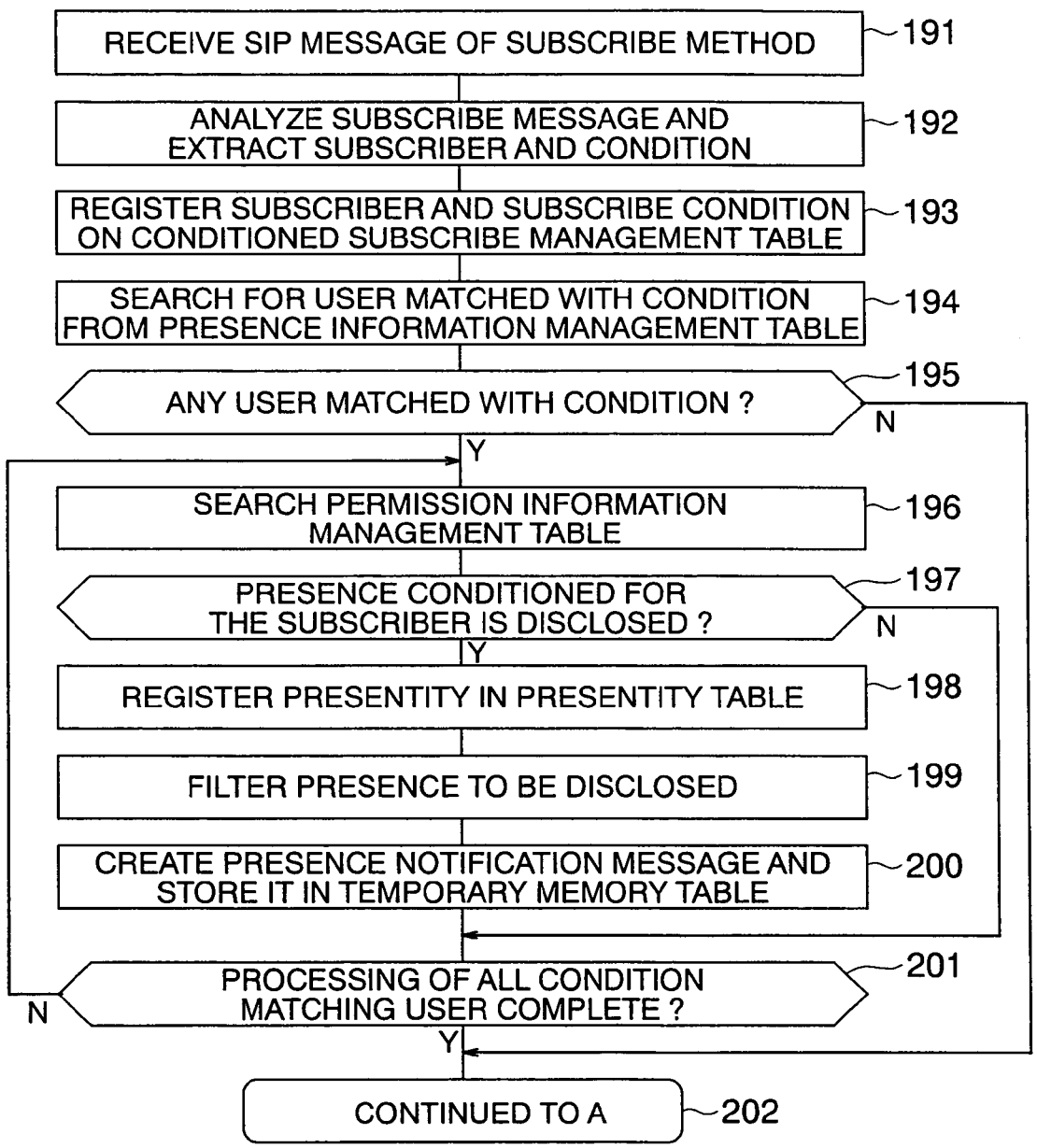
FIG. 16 is a flowchart of the device of the present invention.
Figure 17:
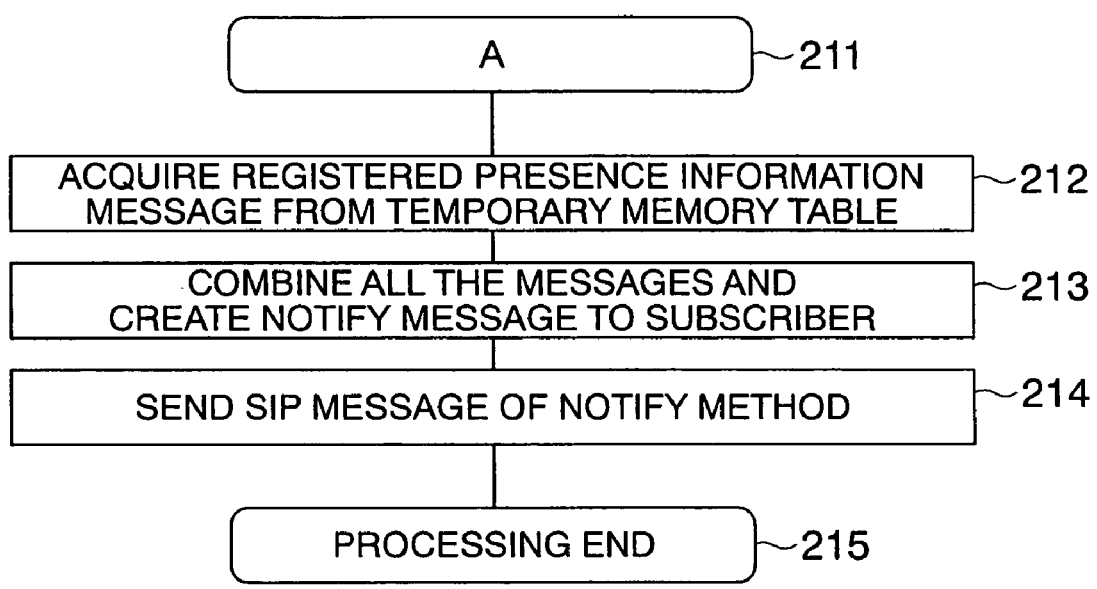
FIG. 17 is a flowchart of the device of the present invention.

FIG. 16 and FIG. 17 show a processing flowchart showing a procedure performed after the server 1 has received the subscribe request transmitted from the terminal of user A denoted by 64. Referring to FIG. 16 and FIG. 17, explanation will be given on the processing procedure of the server 1.

In step 191 of FIG. 16, the server 1 receives a subscribe request in the presence information acquisition request module 13 of FIG. 1. Then control is passed to step 192, where the server 1 analyzes the subscribe message and extracts a subscriber and a condition. The subscriber is a user requesting for acquisition of presence information on another user. In this example, the subscriber is the user who has transmitted the presence information request. This process is performed in a presence information acquisition request analysis module 12. Moreover, in step 192, the analyzed information is transmitted to the presence information/subscribe information management function 2.

The transmitted information is processed in step 193 by a subscribe state management module 7. The subscribe state management module 7 manages the subscribe state such as start and end of the subscribe and subscribe condition by using the subscribe management table 25 shown in FIG. 2. FIG. 9 shows details of the subscribe management table. According to the information received from the presence information acquisition request analysis module, the subscribe state management module registers the subscriber shown by 122 in the table 121 and the subscribe condition in condition 1 shown by 124. When more than one subscribe conditions exist, the conditions are written in 125 and after.

After completing the subscribe registration, in step 194, in order to report the users matched with the current subscribe condition and the presence information on the users to user A who has subscribed, the server 1 searches other users who are matched currently with the subscribe condition specified by user A. This processing is performed in the presentity management module 6 shown in FIG. 1. According to the condition described in the conditioned subscribe management table 25 in FIG. 2, the presentity management module 6 searches for users matched with the subscribe condition from the presence information management table 34 via the IF 30 and the table information I/O unit 37 of the database 31. Since the presence information management table 34 contains a list of the current presence information on each user, users who have registered presence information matched with the subscribe condition can be searched. Thus, without specifying a user name or a group name upon subscribe, it is possible to read presence information on the users matched with the condition.

If no user is matched with the condition in step 195, there is no need of performing the processes of steps 196 to 201 and control is passed to step 202. In the processes of steps 212, 213, 214 in FIG. 17, a message that no users are matched with the condition is sent to the subscriber, thereby terminating the process.

If a user matched with the condition exists in step 195, control is passed to step 196, where a public presence control module 8 searches a permission information management table 32 of the database 31. This is performed because there is a possibility that the user has set that his/her presence information is not to be disclosed. In this case, even if the presence information on the user is matched with the condition specified by the subscriber, the matching of the condition is not reported to the subscriber. By performing this control, it is possible to prevent reporting that the presence information on the user who has set non-disclosure is matched with the condition to the subscriber, i.e., implicitly disclosing the presence information. The permission information management table has configuration as shown in table 171 in FIG. 14. Permission information 172 describes which presence information is to be disclosed by a presentity in the column 173 to a subscriber in the column 172. The permission may be described by using the content set by using the multi-level permission function of JP-2004-108642. After searching the permission information management table 32, if matched with the condition in step 197 and the presence information is to be disclosed to the subscriber, the user is registered in the presentity management table 27 on the memory 22. 131 in FIG. 10 shows an example of table configuration of the presentity management table 27. The presentity management module 6 writes a subscribe management number of the subscriber described in the subscribe management number column 132 of the table 131 and writes the matched user name in the column of the presentity 133 so as to form a pair. Thus, it is possible to manage which subscribe number is currently matched with the condition of which user and reading presence information. If in step 197, the presence information is set not to be disclosed, the processes of steps 198 and 199 are skipped and the user is not recognized as a user matched with the condition. Setting of "non-disclosure" means that the user who has set does not want to report his presence to the subscriber. Here, by not reporting to the subscriber, it is possible to conceal the presence of the user who has set "non-disclosure".

After a presentity user is registered in step 198, a message is created to report the presence information on the user to the subscriber. Here, the presence information which can be reported is confirmed by filtering the presence information to be disclosed in step 199. This process is performed in a disclosure presence control module 8 in FIG. 1. The presence information to be reported is decided by searching the permission information management table 32 of the database 31, the presence information disclosure policy management table 33, and the template management table 35.

The disclosure presence control module 8 firstly searches the policy management table 33. The policy management table is detailed in table 151 shown in FIG. 12. In this table, the presence information registered by user A is confirmed firstly and the record having the presence items such as 153 and 155 and the presence value such as 154 and 156 matched with the presence value of user A is searched for. Since in each record, a plurality of presence items can be specified, there is a case that a plurality of records are matched with the condition. For example, the records 157 and 158 are the example. In this example, the initial presence value of user A is "conference room" for "location" and "design" for "section" and accordingly, and the condition is matched with both of the records 157 and 158. In this case a record having a more detailed condition specification has a higher priority. In this example, the record 157 has a greater number of presence items as conditions, i.e., more detailed condition, and it is assumed that the condition is matched with the record 157. The matching priority may be realized by other than the method described in this example.

In this example, the condition is assumed to be matched with the record 157 and the correspondence template name 152 of the record 157 is checked. In this example, "A" is described. This value is a template value managed by the template management table 35. Configuration of the template management table 35 is detailed in table 161 in FIG. 13. In this table, the record having "A" for the template name 162 has "location", "comment", "material" specified for values of the disclosure presence 163, 164, 165. That is, these three presence items are disclosed. As a result, when user A is performing subscribe with the presence of "location=conference room" and "section=design", it is possible to reference the presence items of "location", "comment", and "material" of another user matched. In this example, one template is assigned for the correspondence template name 152 in FIG. 12. However, it is also possible to assign a plurality of templates. Thus, the server 1 judges which presence information of the condition-matched user can be read according to the value of the presence information on user A. It should be noted that even if the presence information is judge to be disclosed by this process, the presence information is not disclosed if the presence information is set not to be disclosed in the permission information management table 32 which has a higher priority. The presence information disclosure policy management table 33 and the template management table 35 are set by the system administrator. On the other hand, the permission information management table 32 is set by each user to protect his/her privacy for the presence information registered. Accordingly, even if the presence information is set to be disclosed by the system administrator, it is judged not to be disclosed by the server 1 if the setting by the user is non-disclosure for protecting his/her privacy. That is, the filter function which can be set by each person has the highest priority when the disclosure policy to the subscriber is decided. Thus, each user can protect his/her privacy according to the disclosure policy which each user individually has.

After the presence information is filtered in step 199, control is passed to step 200, where a notify message is created for the presence information which can be disclosed and stored in a temporary memory table for preparing transmission.

After these processes are complete, if all condition matching user process is not complete in step 201, control is returned to step 196 for the next user. This is repeated until, the process for all matching users is complete.

When the process of the all matching user is complete, control is passed to step 212 in FIG. 17 for acquiring the message of all matching user registered in the temporary memory table in step 212 in FIG. 17. In step 213, all the messages are combined to create a notify message to the subscriber. This process is performed in the presence information analysis/building module 10. After this, in step 214, transmission is performed from the presence notification transmission module 14 in step 74 of FIG. 5. An example of the transmission message used here is shown in FIG. 7 and FIG. 8. In this example, the SIP NOTIFY message is used for notifying the presence information. However, if the same function is satisfied, another protocol may also be used. The portion shown in 111 of FIG. 7 is a SIP message header and the portions shown in 113, 114 are a SIP message body. The SIP message header contains a From header 112 showing the message transmission source, where the SIP-URI of the user A himself/herself is described instead of the SIP-URI of the transmission source user or group. This portion need not be the SIP-URI of the user A and may be any value. Moreover, 113 and 114 are SIP bodies showing the content of the presence information. This portion is described according to the format defined in draft-ietf-simple-event-list-06.txt. The portion shown in 113 describes a member list describing the presence information in the notify message, i.e., the list of the users who have matched in the presentity management module 6. 114 of FIG. 8 describes the content of presence information on each user. In this example, the presence information is described according to the format of draft-ietf-simple-event-list-06.txt. However, the presence information may also be described in other method.

Next, in step 75 of the sequence diagram, the server 1 sends an inquiry to user A who has performed subscribe asking how much presence information is to be disclosed to subscribe by other users. By sending the inquiry, the server 1 can confirm the information disclosure policy of the user who discloses the presence information. This inquiry is sent each time the presence information on user A is updated and the matching object is changed. User A may want to modify the disclosure policy according to the content of the presence information. In such a case, by performing an inquiry each time the presence information is updated, the server 1 can know even a small change of the disclosure policy of user A. For example, by using this inquiry, user A can disclose the brought-in materials and a comment if in a conference room but not discloses them while sitting at his/her seat (including a case when it is judged that there is no need of disclosure), thereby changing the disclosure presence information. When user A has received presence information on the user matched with the condition in step 74, the user matched has already received the inquiry like step 75 when the user changed the presence information "location" to "conference room" and accordingly, the presence information is transmitted to user A. Upon reception of the inquiry, if user A replies permission of disclosure of the presence information in step 76, the server 1 transmits a message that user A is matched with the condition to user C in step 77. However, if user A replies rejection of disclosure of the presence information in step 76, no message is sent in step 77. Without making notification, it is possible to prevent flow-out of the information on user A who has rejected. It should be noted that when user A replies permission of disclosure of the presence information in step 76, in this example, a message that user A is matched with the condition is also sent to the user A himself/herself. However, this process may be omitted. The transmission enabled/disabled policy may be decided for each system. Furthermore, for the portion from step 75 to 78 (step group defined by a frame 82), the execution enabled/disabled policy may be decided on system unit and may not be performed if not required. When this step group is not performed, the presence information on user A is reported to user C according to the permission information set in advance by user A and the setting of the presence information disclosure policy management table 33 in the database 31 of FIG. 2 set by the system administrator. The notification method is based on the processing flowchart for update of the presence information by user A which will be detailed later.

The, suppose that user A modifies his/her presence information "location" from "conference room" to "sitting room" in step 79. Here, the server 1 performs a process to confirm the modification of the subscribe match user caused by the update of the presence information. This process will be detailed later.

Figure 18:
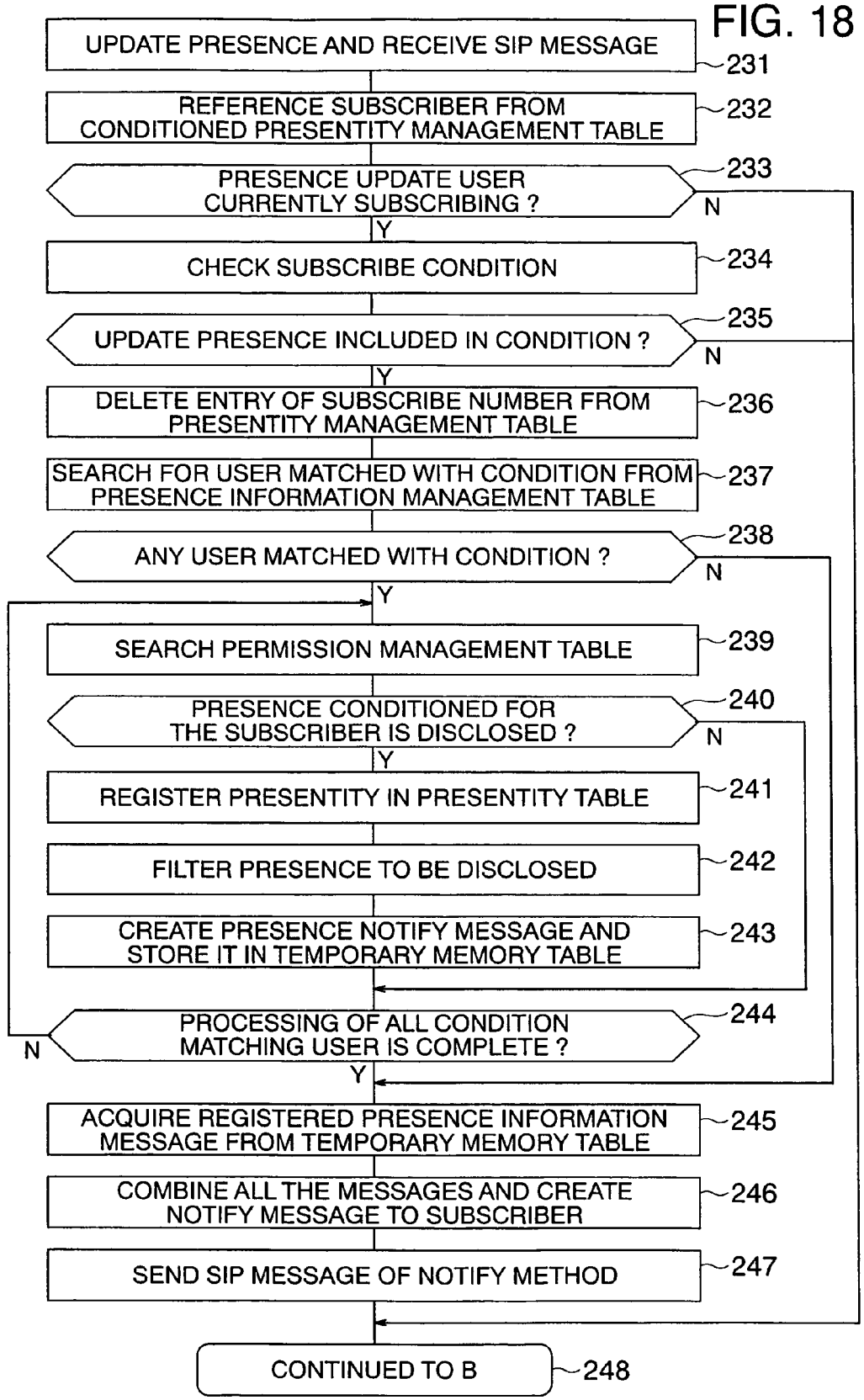
FIG. 18 is a flowchart of the device of the present invention.
Figure 19:
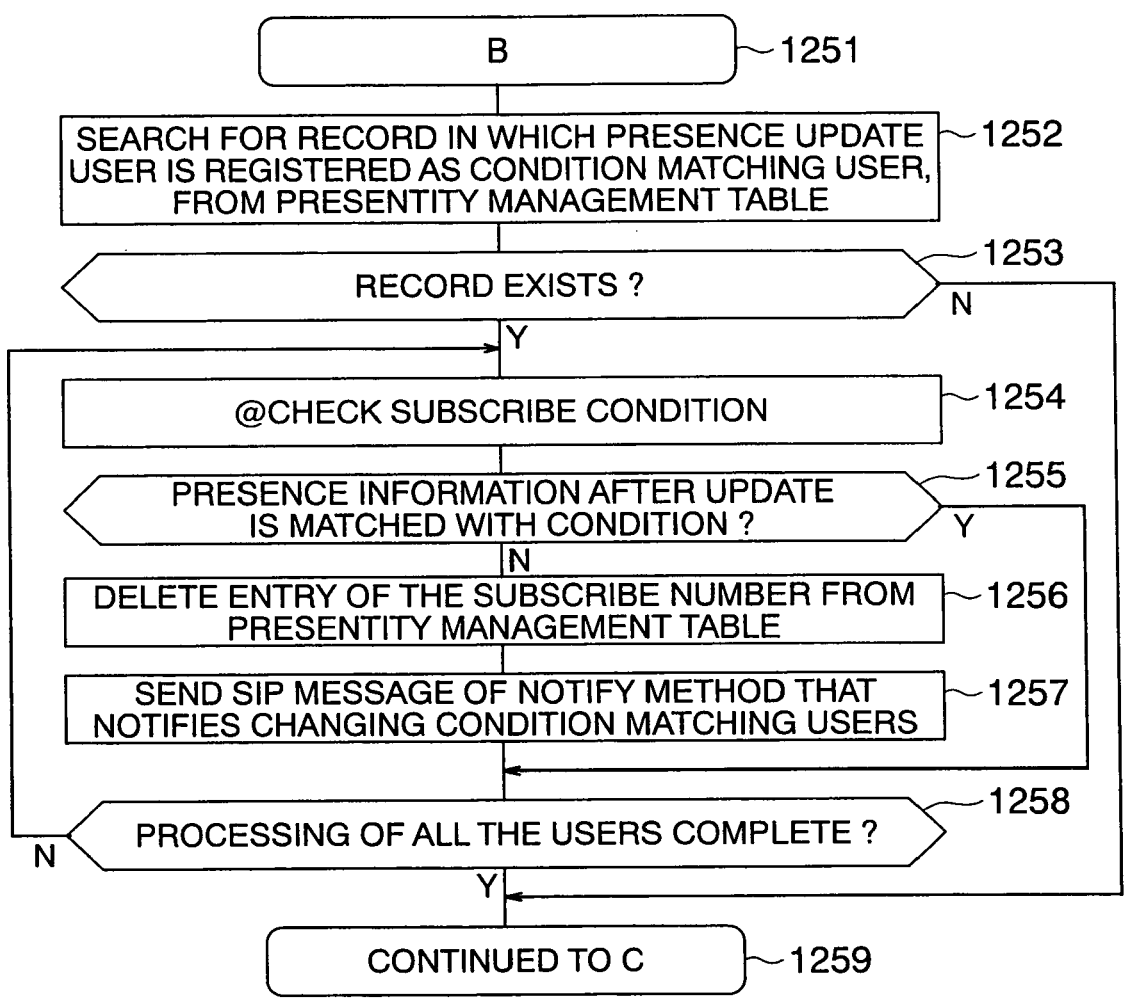
FIG. 19 is a flowchart of the device of the present invention.

FIG. 18 and FIG. 19 are flowcharts of the aforementioned process. In step 231 of FIG. 18, the server 1 receives the presence information update message in the presence information transmission/reception module 11 of FIG. 1. Furthermore, the presence information analysis/building module 10 extracts presence information to be registered. After this, the presence information management module 9 updates the presence information in the presence information management table 34 of the database 31 from the IF 30 via the various information input module 4. After this, update of the subscribe match user is started by presence update.

Firstly, in step 232, the server 1 searches the conditioned subscribe management table 25 in the memory 22 by the presentity management module 6 so as to check whether the presence update user is currently performing subscribe. Next, in step 233, if no subscribe is being performed, the process of steps 234 to 247 is skipped and control is passed to step 248.

When step 233 judges that subscribe is being performed, control is passed to step 234, where the condition of the subscribe is checked by searching the conditioned subscribe management table 25 in the memory 22. The subscribe condition is described as the item of the presence information and the condition for the values. In the next step 235, if the condition check results in that the item of the updated presence information "is not contained" in a part of the presence information item specified as the subscribe condition, control is passed to step 248 by skipping the processes of steps 236 to 247. In this example, user A specifies as the subscribe condition that the presence information item "location" is "identical value" (condition). Since user A has modified "location" from "conference room" to "sitting room", the server 1 judges that the updated presence information item is contained as a part of the subscribe condition. Like in this example, when comparison of the user's presence information value to compared to the presence information value of the partner is presented as a condition and a part of the presence information item as a condition is contained in the updated presence information item, user A updates the presence information, so that the subscribe condition of user A is changed from that "location" is "conference room" to that "location" is "sitting room".

If step 235 judges that the updated presence information item "is contained" in the subscribe condition, the next step 236 deletes all the users currently matched with the subscribe from the presentity management table 27 on the memory 22. This is performed because the subscriber has modified the presence information and the users matched with the condition are changed and matching process should be performed again. In this example, the presence information "location" updated by user A is contained in the subscribe condition of user A and control is passed to step 236.

The process from the next step 237 to step 247 is identical to the processing flowchart of the aforementioned step 194 of FIG. 16 to step 214 of FIG. 17. The message transmitted in step 247 is transmitted to user A in step 74 in the sequence shown in FIG. 5.

Next, in step 1252, the server 1 searches the presentity management table 27 on the memory table 22 by using the presentity management module 6 of FIG. 1 and checks other user who is establishing subscribe to the user who has updated the current presence information. If step 1253 judges that no other user is establishing subscribe, control is passed to step 1259 by skipping the process of steps 1254 to 1258. If step 1253 judges that other user is establishing subscribe, control is passed to step 1254, which checks the subscribe condition of the other user establishing subscribe from the conditioned subscribe management table 25 on the memory 22.

After this, step 1255 checks whether the updated presence information on user A is matched with the subscribe condition of the other user. If matched, there is no need of updating the presentity and control is passed to step 1258 by skipping the process of steps 1256 and 1257.

When the presence information on user A updated in step 1255 does not match with the subscribe condition of the aforementioned other user, control is passed to step 1256. In this example, since user A has updated the presence information, the presence information does not match with the subscribe condition set by user C and control is passed to step 1256. In step 1256, the presentity management module 6 deletes the entry of the presentity from the presentity management table 27 on the memory 22. This is because the new presence information on the user who has updated the presence information does not match with the condition and it is removed from the presentity.

After this, in step 1257, a message telling that the subscribe condition match user is modified is sent to the aforementioned other user as the subscriber. As a result, in this example, step 83 in the sequence diagram performs presence information notification that user A is not contained in the condition match user, to user C.

Next, in step 1258, if the process for all the users is not complete, control is returned to step 1254 and the process of the other users is performed again. When the process of all the users is complete, control is passed to step 1259 for starting the process of step 252.

Figure 20:
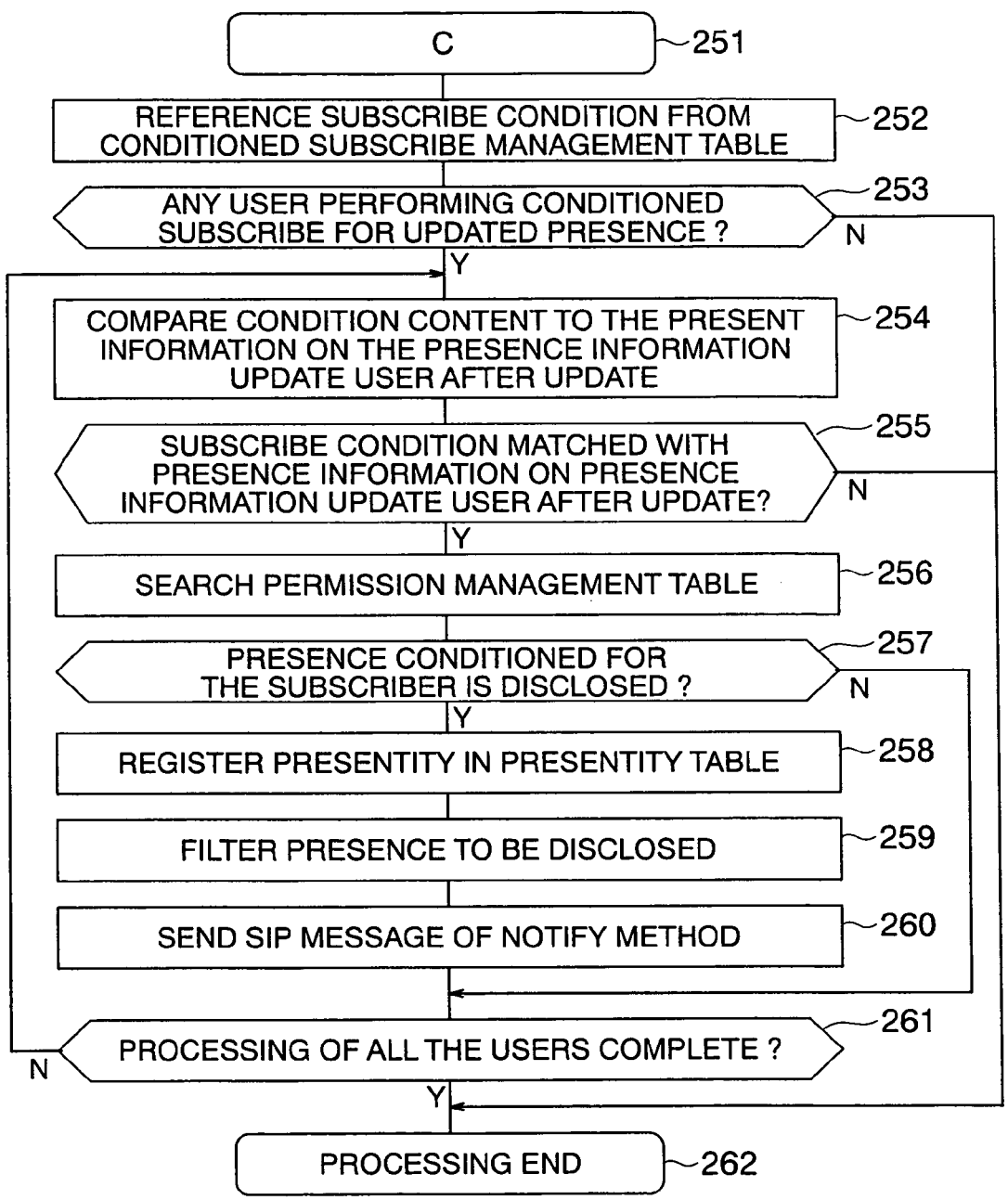
FIG. 20 is a flowchart of the device of the present invention.

In step 252 of FIG. 20, the server 1 searches the conditioned subscribe management table 25 on the memory table 22 by using the presentity management module 6 of FIG. 1 and performs matching between the updated new presence information and the subscribe condition of the other user currently subscribed.

When no other user is establishing the conditioned subscribe for the new presence information updated in step 253, control is passed to step 262 to terminate the process by skipping the process of steps 254 to 261. If any other user is present, control is passed to step 254. In this example, user B is establishing the conditioned subscribe as an object and control is passed to step 254. In step 254, the condition content is compared to the presence information after updating of the presence information update user.

After this, instep 255, if the subscribe condition does not match with the presence information after update of the presence information update user, control is passed to step 262 to terminate the process by skipping the process of steps 256 to 261. When matched, control is passed to step 256. In this example, the condition of user B is matched with the new presence information on user A and control is passed to step 256. By performing this condition matching, it becomes possible to update the user matched with the subscribe condition of user B as the other user as a result of updating of the presence information by user A.

The process of steps 256 to 259 is a permission-related process like the steps 239 to 243 of FIG. 18 described in the flowchart of FIG. 16. Only when the presence information is judged to be disclosed after the permission process is complete, a newly matched user is reported to user B in step 260. Moreover, the permission processes include the presence information disclosure request message from the server 1 in step 84 of the sequence diagram, the replay message of step 85, and the message of step 87. The contents of these two steps are identical to the frame 82 of the sequence diagram. By the process of step 260, in 78 of the sequence diagram, a message is sent from the server 1 to user B.

After this, if the process for all the users is not complete in step 261, control is returned to step 254 for performing the process for the remaining users and the process is again performed. When the process for all the users is complete, control is passed to step 262.

After this, in step 79 in the sequence diagram, the presence information modifies "location" from "conference room" to "sitting room", which is reported to user C. This process is identical to steps 79, 83 in the sequence diagram.

By such an operation, each user can perform conditioned subscribe for the server 1. While changing the presentity as the presence information of both sides change, it is possible to reference the presence information on the other user matched with the condition and information permitted to be disclosed by the system and by the other user himself/herself.

In this way, by establishing subscribe only by specifying the condition without specifying any user identifier or group identifier, user A can acquire a presentity without knowing the user identifier or group identifier of the partner. Furthermore, as the presence information on user A has changed and the presentity has changed, user A need not do anything. Subscribe for the other user matched with a new condition is automatically started and the subscribe of the other user deleted from the presentity by the change of the condition is automatically released.

Embodiment 2

Figure 21:
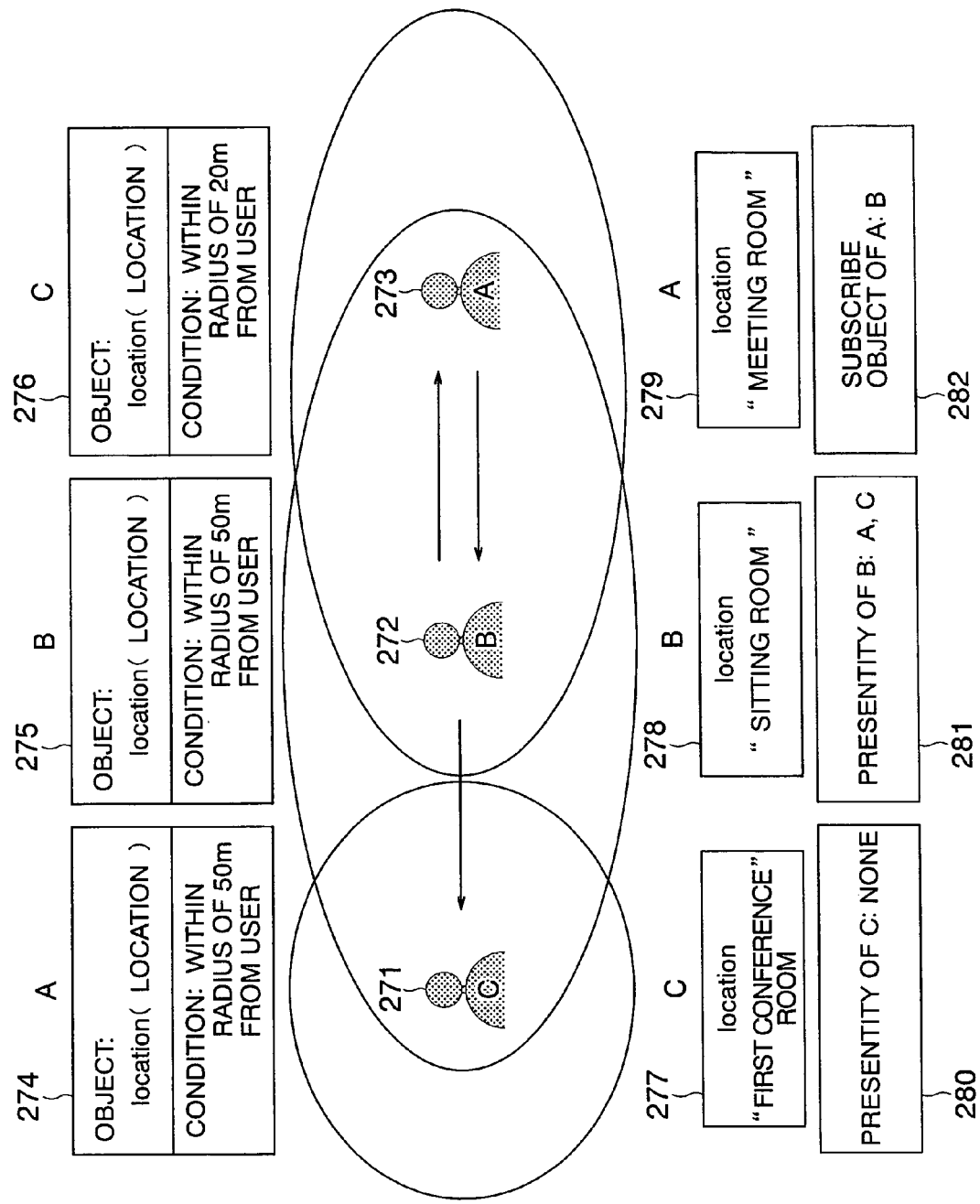
FIG. 21 shows a second operation concept of the present invention.

FIG. 21 shows a second embodiment of the present invention. In this example, A denoted by 273, B denoted by 272, and C denoted by 271 are establishing subscribe with different subscribe conditions 274, 275, and 276. In this example, instead of the condition "same" like in FIG. 3, a range within X m is specified. By specifying the condition as a range, it is possible to set a range of users as presentity matched with the condition. They have location values 277, 278, and 279 as presence information. Here, since the subscribe condition specified by the users are different (the ranges are different), the presentity is asymmetric. That is, no other user matched with the condition of C exists as shown in 280 and C does not read presence information on other users while B is reading the presence information on C as shown in 281. Moreover, B and A are performing subscribe symmetrically as shown in 281 and 282 and reading presence information on each other. According to the method for specifying the condition, there is a possibility that a subscribe in such an asymmetric state may be generated. Each user can set an independent condition on the system like Embodiment 1. By using this configuration, each user presents separate subscribe conditions to the server, thereby realizing such an asymmetric subscribe.

Embodiment 3

Figure 22:
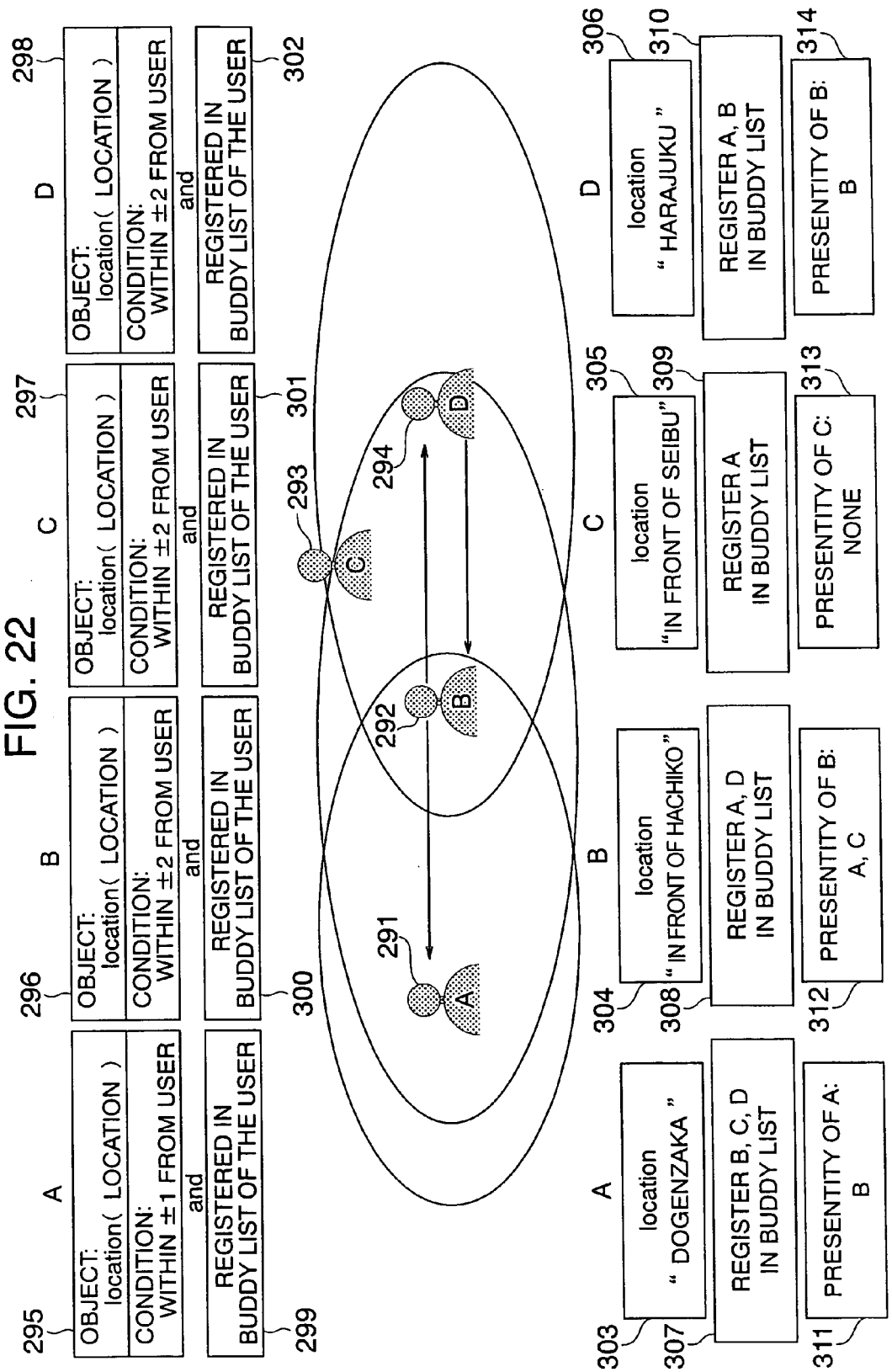
FIG. 22 shows a third operation concept of the present invention.

FIG. 22 shows a third embodiment of the present invention. In this example, four persons, i.e., A denoted by 291, B denoted by 292, C denoted by 293, and D denoted by 294 are establishing conditioned subscribe. Their respective conditions are 295 to 302. In this example, each user specifies registration in his/her buddy list as the subscribe condition without specifying any presence information value. In this setting, the side who performs subscribe limits the range of users matched with the condition. Thus, each user can specify the condition matching range when establishing subscribe. Furthermore, a system administrator can set such a range. Even when each user establishes subscribe by specifying a condition to limit a range of the users to be matched, the condition content is stored in the condition column like 124 in the table 121 of FIG. 9. When the administrator sets the condition and each user establishes subscribe, matching is performed only in the user range set by the administrator. Moreover, each user can set a range within some degree instead of "same" for the condition of the presence information "location" like the example in FIG. 3. The range specification will be explained by referring to FIG. 23.

FIG. 23 shows relationship between values for the presence information "location". When such a setting is performed by the system administrator, it is possible to define the range of the value. In this example, the distance between 338 "Center street" and 337 "In front of Hachiko" is set to 1. When considering this way, the distance between 333 "Times square" and 334 "Harajuku" is 3. Moreover, the distance between 338 "Center street" and 335 "In front of Seibu" is 2 or 3 since there are two types of distance calculation patters from the Center street to In front of Seibu. In such a case, it is possible to select the shorter distance or the longer distance on system unit. In this example, since the position information is used as the presence information the "distance" specifies a physical distance. However, the "distance" may not specify a physical distance but a logical distance. For example, the "distance" can define for the class shown in 930. In this case, the "distance" indicates a logical distance showing hierarchical relationship in an organization such as a headquarter director denoted by 931 and a center director denoted by 932 at the uppermost hierarchy, a department director denoted by 933 at the next uppermost hierarchy, and below it is arranged a section director denoted by 934 and a unit leader denoted by 935. Thus, depending on the presence item to be defined, a logical distance can be defined.

Returning to FIG. 22, consideration is taken on the condition content of each user and the matching user. In FIG. 22, the current presence information on each user is 303 to 306 and buddy list registration user of each user is 307 to 310.

User A denoted by 291 is reading the presence information on B present in the condition range of "location" like 311. User C is registered in the buddy list of A but the "location" of C is not within the condition range of A. Accordingly, C is not matched with the subscribe condition of A. As for B denoted by 292, three persons A, C, D are in the range of "location" but only users A and D are registered in the buddy list. Accordingly, like 312, the presence information on only these two persons is read. C has registered only A in the buddy list but A is not in the condition range of "location". Accordingly, presentity is "none" as shown in 313. As for D, B exists in the condition range of "location" and makes B as the presentity as shown in 314. Thus, by defining a distance between the values of the presence information, even when using conceptual values like location names in the Embodiment 3 between which specific distance cannot be known, a logical distance can be defined and the server can calculate the range of the subscribe.

Embodiment 4

Figure 24:
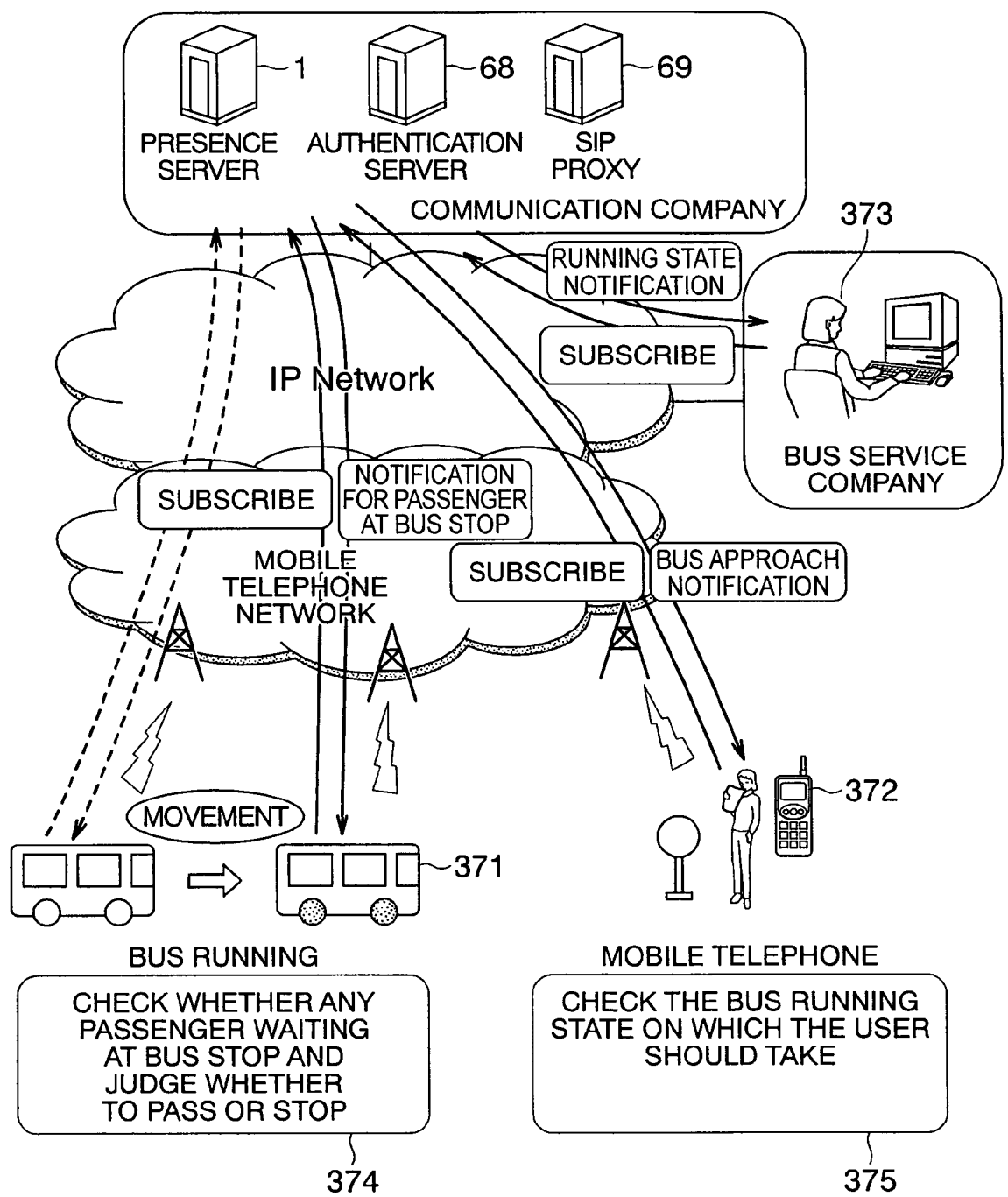
FIG. 24 shows a fourth service image of the present invention.
Figure 25:
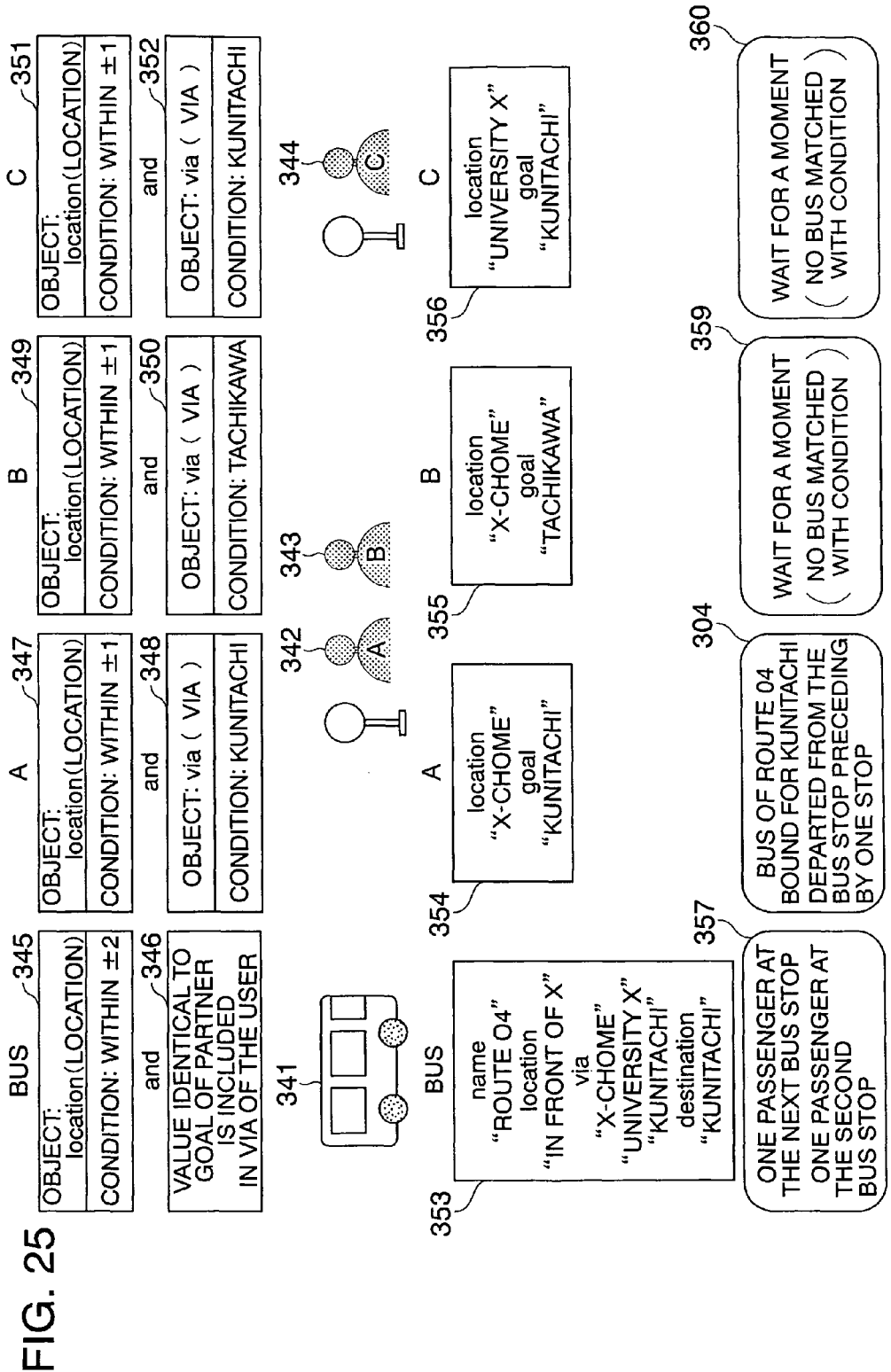
FIG. 25 shows a fourth operation concept of the present invention.

FIG. 24 shows a service image diagram according to a fourth embodiment of the present invention. This service includes following three services: a service 375 for the user 372 to check the running condition of the bus the user should take, a service for the bus company 373 to check the running condition of its buses, and a service 374 for a running bus to check whether any user waiting at a bus stop. The specific contents of this service will be explained by referring to FIG. 25. FIG. 25 shows an operation concept diagram of the service of FIG. 24. In this example, user A denoted by 342, a user B denoted by 343, and user C denoted by 344 are waiting for a bus at their respective bus stops. Moreover, the bus denoted by 341 is currently running. The destination of the bus is "Kunitachi" as shown in "destination" of 353. The bus runs along "1-chome", "X University", and "Kunitachi" as shown by "via". The users A and C want to go to bus stop "Kunitachi" as shown in "goal" of 354 and 356 while the user B wants to go to bus stop "Tachikawa" as shown by "goal" of 355. It is assumed that the users A, B, and C and the bus are performing condition-specifying type subscribe with the conditions 345 to 352 for the server 1. Moreover, between bus stops, there is a value relationship as shown by 322 to 331 in FIG. 23.

Here, the user A is waiting for a bus at the bus stop of "1-chome" and the goal is "Kunitachi". The bus 341 is currently at the bus stop which is one stop before and the destination is "Kunitachi". Accordingly, the bus is matched with the condition. That is, the presentity of the user A includes the bus indicated by 341 and the user A can get a message 304 telling that the bus of route 04 bound for Kunitachi has left the bus stop which is one stop before. The user B is also waiting at the same bus stop as the user A but the destination is Tachikawa where the bus of 341 does not stop. Accordingly, no information on the bus denoted by 341 is not reported to the user B. Moreover, the user C's goal is Kunitachi but the distance between C and the bus is 2 and the condition "location" is not matched. Accordingly no information on the bus 341 is reported to C. It should be noted that between users A, B, and C, the range of "location" is 1 or less but they are not matched for the value "via" specified as the second condition (users A, B, and C do not have the presence information "via" and have not set them). Accordingly, no matching is caused between the users.

Moreover, the bus denoted by 341 subscribes with the condition that the "location" is within ±2 and "via" has the same value as the "goal" of a user. Accordingly, it is possible to obtain the information on A and C who have registered the value "goal" as "Kunitachi" which exists in "via". As a result, it is possible to grasp in advance that a user-passenger (A) is waiting at the next bus stop and a user-passenger (C) is waiting at the second bus stop counted from the current bust stop. Although the three presence information "location", "via", and "goal" indicate different meanings but by specifying the presence information items as the matching condition depending on the user's purpose, i.e., by matching the "goal" of each user and the "via" of the bus transporting the users there, it is possible to achieve the purpose of each user.

Thus, when the invention is applied to a bus running system, a user can know the actual running condition of the bus whose arrival is easily changed depending on the road condition. Furthermore, a bus driver who had to check visually whether a passenger is waiting at a bus stop can know in advance whether a passenger is waiting and decide to stop the bus at each bus stop.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A state information management system comprising:
a server for managing state information on a plurality of terminals,
wherein the server includes:
a memory unit which stores the state information so as to correspond with at least one of information identifying the terminals, information identifying users of the terminals and information identifying a group to which the terminals or the users of the terminal belong;
a reception unit which receives a state information disclosure request from a first terminal among the plurality of terminals;
a control unit which extracts a state information extraction condition from the state information disclosure request; and a transmission unit which transmits state information on one or a plurality of other terminals matched with the state information extraction condition among the state information stored in the memory unit, to the first terminal, wherein when the number of other terminals matched with the state information extraction condition is increased or decreased, the transmission unit again transmits new state information on the one or more other terminals reflecting the increased or decreased number of other matching terminals to the first terminal.

2. A state information management system according to claim 1, wherein the state information extraction condition is a relative location condition in relation to said first terminal.

3. A state information management system according to claim 1, wherein the new state information is transmitted to the first terminal when the state information in the first terminal is updated.

4. A state information management system according to claim 1, wherein the new state information is transmitted to the first terminal when the state information in a terminal other than the first terminal is updated.

5. A state information management server for managing state information on a plurality of terminals, wherein the server comprising:

a memory unit which stores the state information so as to correspond with at least one of information identifying the terminals, information identifying users of the terminals and information identifying a group to which the terminals or the users of the terminal belong;

a reception unit which receives a state information disclosure request from a first terminal among the plurality of terminals;

a control unit which extracts a state information extraction condition from the state information disclosure request; and a transmission unit which transmits state information on one or a plurality of other terminals matched with the state information extraction condition among the state information stored in the memory unit, to the first terminal, wherein when the number of other terminals matched with the state information extraction condition is increased or decreased, the transmission unit again transmits new state information on the one or more other terminals reflecting the increased or decreased number of other matching terminals to the first terminal.

6. A state information management server according to claim 5, wherein the state information extraction condition is a relative location condition in relation to said first terminal.

7. A state information management server according to claim 5, wherein the new state information is transmitted to the first terminal when the state information in the first terminal is updated.

8. A state information management server according to claim 5, wherein the new state information is transmitted to the first terminal when the state information in a terminal other than the first terminal is updated.

* * * * *